US010838132B1

(12) United States Patent
Calafiore et al.

(10) Patent No.: US 10,838,132 B1
(45) Date of Patent: Nov. 17, 2020

(54) DIFFRACTIVE GRATINGS FOR EYE-TRACKING ILLUMINATION THROUGH A LIGHT-GUIDE

(71) Applicant: Facebook Technologies, LLC, Menlo Park, CA (US)

(72) Inventors: Giuseppe Calafiore, Redmond, WA (US); Hee Yoon Lee, Bellevue, WA (US); Robin Sharma, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/107,395

(22) Filed: Aug. 21, 2018

(51) Int. Cl.
G02B 27/01 (2006.01)
F21V 8/00 (2006.01)
G06F 3/01 (2006.01)

(52) U.S. Cl.
CPC ......... *G02B 6/0036* (2013.01); *G02B 6/0015* (2013.01); *G02B 27/0172* (2013.01); *G02B 2027/0178* (2013.01); *G06F 3/013* (2013.01)

(58) Field of Classification Search
USPC .......................................................... 385/3
See application file for complete search history.

(56) References Cited

U.S. PATENT DOCUMENTS

| 6,433,760 | B1 | 8/2002 | Vaissie et al. |
| 7,522,344 | B1 | 4/2009 | Curatu et al. |
| 9,335,548 | B1 | 5/2016 | Cakmakci et al. |
| 9,459,451 | B2 * | 10/2016 | Saarikko ............ G02B 6/02085 |
| 9,555,589 | B1 | 1/2017 | Ambur et al. |
| 9,658,453 | B1 | 5/2017 | Kress et al. |
| 9,791,924 | B2 | 10/2017 | Shiu et al. |
| 10,423,222 | B2 * | 9/2019 | Popovich ................ G06F 3/013 |
| 2002/0154292 | A1 | 10/2002 | Fukuma et al. |
| 2008/0068836 | A1 | 3/2008 | Hatanaka et al. |

(Continued)

FOREIGN PATENT DOCUMENTS

| WO | 2014188149 | 11/2014 |
| WO | 2017039820 | 3/2017 |

OTHER PUBLICATIONS

U.S. Appl. No. 15/785,222, "Non-Final Office Action", dated Nov. 19, 2018, 20 pages.

(Continued)

*Primary Examiner* — Eric Wong
(74) *Attorney, Agent, or Firm* — Weaver Austin Villeneuve & Sampson LLP

(57) ABSTRACT

Techniques for eye-tracking in a near-eye display system are disclosed. One example of a near-eye display system includes a substrate transparent to visible light and configured to be placed in front of a user's eye, one or more light sources configured to emit illumination light invisible to the user's eye, one or more input couplers configured to couple the illumination light into the substrate, and one or more grating couplers each configured to couple a portion of the illumination light out of the substrate and towards the user's eye at a different direction. The illumination light coupled into the substrate propagates within the substrate through total internal reflection. The one or more grating couplers include at least one of a chirped surface-relief grating coupler or a volume Bragg grating coupler.

20 Claims, 23 Drawing Sheets

(56) References Cited

U.S. PATENT DOCUMENTS

| | | | |
|---|---|---|---|
| 2008/0291951 A1* | 11/2008 | Konttinen | G02B 5/1809 372/21 |
| 2010/0149073 A1* | 6/2010 | Chaum | G02B 27/0093 345/8 |
| 2013/0063550 A1 | 3/2013 | Ritchey et al. | |
| 2013/0107214 A1 | 5/2013 | Blixt et al. | |
| 2014/0285429 A1* | 9/2014 | Simmons | G02B 27/225 345/156 |
| 2015/0219899 A1 | 8/2015 | Mack et al. | |
| 2016/0077338 A1* | 3/2016 | Robbins | G02B 27/0172 345/8 |
| 2016/0085300 A1 | 3/2016 | Robbins et al. | |
| 2016/0274659 A1 | 9/2016 | Caraffi et al. | |
| 2017/0082858 A1 | 3/2017 | Klug et al. | |
| 2017/0090562 A1 | 3/2017 | Gustafsson et al. | |
| 2017/0177075 A1 | 6/2017 | Zhang | |
| 2017/0205877 A1 | 7/2017 | Qin | |
| 2017/0285337 A1 | 10/2017 | Wilson et al. | |
| 2017/0285741 A1 | 10/2017 | Park et al. | |
| 2017/0299869 A1 | 10/2017 | Urey et al. | |
| 2018/0045960 A1* | 2/2018 | Palacios | G02B 27/017 |
| 2018/0074340 A1 | 3/2018 | Robbins et al. | |
| 2018/0113508 A1 | 4/2018 | Berkner-Cieslicki et al. | |
| 2018/0275409 A1 | 9/2018 | Gao et al. | |
| 2019/0129174 A1 | 5/2019 | Perreault | |
| 2019/0258062 A1 | 8/2019 | Aleem et al. | |
| 2019/0286228 A1 | 9/2019 | Sangu | |
| 2019/0364228 A1 | 11/2019 | Larsen | |

OTHER PUBLICATIONS

U.S. Appl. No. 16/179,650, "Non-Final Office Action", dated Oct. 28, 2019, 8 pages.
U.S. Appl. No. 16/179,650, "Notice of Allowance", dated Mar. 19, 2020, 8 pages.
U.S. Appl. No. 15/785,217, "Non-Final Office Action", dated Feb. 6, 2020, 13 pages.
U.S. Appl. No. 15/785,219, "Non-Final Office Action", dated Jan. 27, 2020, 16 pages.
U.S. Appl. No. 16/179,656, "Non-Final Office Action", dated Feb. 4, 2020, 19 pages.
U.S. Appl. No. 15/785,217, Final Office Action dated May 15, 2020, 17 pages.
U.S. Appl. No. 16/179,656, Final Office Action dated May 28, 2020, 21 pages.
International Application No. PCT/US2019/046517, International Search Report and Written Opinion dated Jan. 27, 2020, 17 pages.

* cited by examiner

1400

1400

DIFFRACTIVE GRATINGS FOR EYE-TRACKING ILLUMINATION THROUGH A LIGHT-GUIDE

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

To provide a more immersive artificial reality experience, some artificial reality systems may include an input device for receiving user inputs, such as hand and/or finger movements. Additionally or alternatively, artificial reality systems can employ eye-tracking systems that can track the user's eye (e.g., gaze direction). The artificial reality systems may then employ the gaze direction information and/or information gained from the input device to modify or generate content based on the direction in which the user is looking, thereby providing a more immersive experience for the user. Eye-tracking systems can also be used for foveated imaging, foveated transmission of image data, alertness monitoring, etc.

SUMMARY

This disclosure relates generally to eye tracking in near-eye display systems.

According to certain embodiments, a near-eye display system may include a substrate transparent to visible light and configured to be placed in front of a user's eye, one or more light sources configured to emit illumination light invisible to the user's eye, one or more input couplers configured to couple the illumination light into the substrate, and one or more grating couplers formed on the substrate. The illumination light coupled into the substrate may propagate within the substrate through total internal reflection. The one or more grating couplers may include at least one of a chirped surface-relief grating coupler or a volume Bragg grating coupler, where each grating coupler may be configured to couple a portion of the illumination light propagating within the substrate out of the substrate and towards the user's eye at a different direction.

In some embodiments of the near-eye display system, the substrate may include a curved or a flat surface. The one or more light sources may be positioned in a peripheral of a field of view of the user's eye. In some embodiments, the one or more light sources may include a light emitting device (e.g., a light emitting diode (LED), a laser diode, or vertical cavity surface emitting lasers (VCSELs)) and collimating optics for collimating light emitted by the light emitting device. In some embodiments, the one or more input couplers may include a diffractive grating, a prism, a slanted transmissive surface, or a slanted reflective surface.

In some embodiments, each grating coupler of the one or more grating couplers may have a varying grating period or tilt angle in a region of the grating coupler.

In some embodiments, the one or more light sources may include two or more light sources, and the one or more input couplers may include two or more input couplers, where each input coupler may correspond to a respective light source and may be configured to couple the illumination light from the respective light source into the substrate. The one or more grating couplers may include two or more groups of grating couplers, each group aligned with a respective input coupler and configured to direct the illumination light from a corresponding light source towards the user's eye.

In some embodiments, the one or more light sources may include one light source, the one or more input couplers may include one input coupler, the one or more grating couplers may include two or more groups of grating couplers, and the near-eye display system may further include two or more diffractive gratings formed on the substrate. Each diffractive grating may be aligned with a respective group of grating couplers and configured to divert a portion of the illumination light from the light source towards the respective group of grating couplers.

In some embodiments of the near-eye display system, each of the one or more grating couplers may include multiple regions. Each of the multiple regions may include a grating configured to couple a portion of the illumination light propagating within the substrate out of the substrate and towards a different region on the user's eye.

In some embodiments of the near-eye display system, the one or more grating couplers may include two grating couplers. The two grating couplers may be configured to couple illumination light from a same light source out of the substrate such that the illumination light coupled out of the substrate by the two grating couplers may form an interference fringe pattern on the user's eye.

According to certain embodiments, a display device may include a substrate transparent to visible light and configured to be placed in front of a user's eye, one or more input couplers configured to couple illumination light from one or more light sources into the substrate, and one or more grating couplers formed on the substrate. The illumination light coupled into the substrate may propagate within the substrate through total internal reflection, where the illumination light may be invisible to the user's eye. The one or more grating couplers may include at least one of a chirped surface-relief grating coupler or a volume Bragg grating coupler, where each grating coupler may be configured to couple a portion of the illumination light propagating within the substrate out of the substrate and towards the user's eye at a different direction. In various embodiments, the substrate may include a curved or a flat surface.

In some embodiments of the display device, the one or more input couplers may include two or more input couplers, where each input coupler may correspond to a respective light source and may be configured to couple the illumination light from the respective light source into the substrate. The one or more grating couplers may include two or more groups of grating couplers, each group aligned with a respective input coupler and configured to direct the illumination light from a corresponding light source towards the user's eye.

In some embodiments of the display device, the one or more input couplers may include one input coupler configured to couple the illumination light from one light source into the substrate. The one or more grating couplers may include two or more groups of grating couplers. The display device may further include two or more diffractive gratings formed on the substrate. Each diffractive grating may be aligned with a respective group of grating couplers and configured to divert a portion of the illumination light from the light source towards the respective group of grating couplers.

In some embodiments, the one or more input couplers may include a diffractive grating, a prism, a slanted transmissive surface, or a slanted reflective surface. Each grating coupler of the one or more grating couplers may have a varying grating period or tilt angle in a region of the chirped grating coupler. In some embodiments, each grating coupler of the one or more grating couplers may include multiple regions, where each region may include a grating configured to couple a portion of the illumination light propagating within the substrate out of the substrate and towards a different region on the user's eye. In some embodiments, the one or more grating couplers may include two grating couplers, where the two grating couplers may be configured to couple illumination light from a same light source out of the substrate such that the illumination light coupled out of the substrate by the two grating couplers may form an interference fringe pattern on the user's eye.

According to certain embodiments, a method of illuminating an eye of a user of a near-eye display system may include coupling, by an input coupler, illumination light (e.g., light invisible to the eye of the user) from a light source into a substrate of the near-eye display system, and reflecting the coupled illumination light by surfaces of the substrate through total internal reflection such that the illumination light may propagate within the substrate. The method may also include diffracting, by each of a set of grating couplers formed at a plurality of locations on the substrate, a portion of the illumination light propagating within the substrate out of the substrate and towards the eye of the user at a different direction, where the set of grating couplers may include at least one of a chirped surface-relief grating coupler or a volume Bragg grating coupler. In some embodiments, the method may also include splitting the coupled illumination light into multiple illumination light beams and directing each of the multiple illumination light beams towards a respective group of grating couplers in the set of grating couplers.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
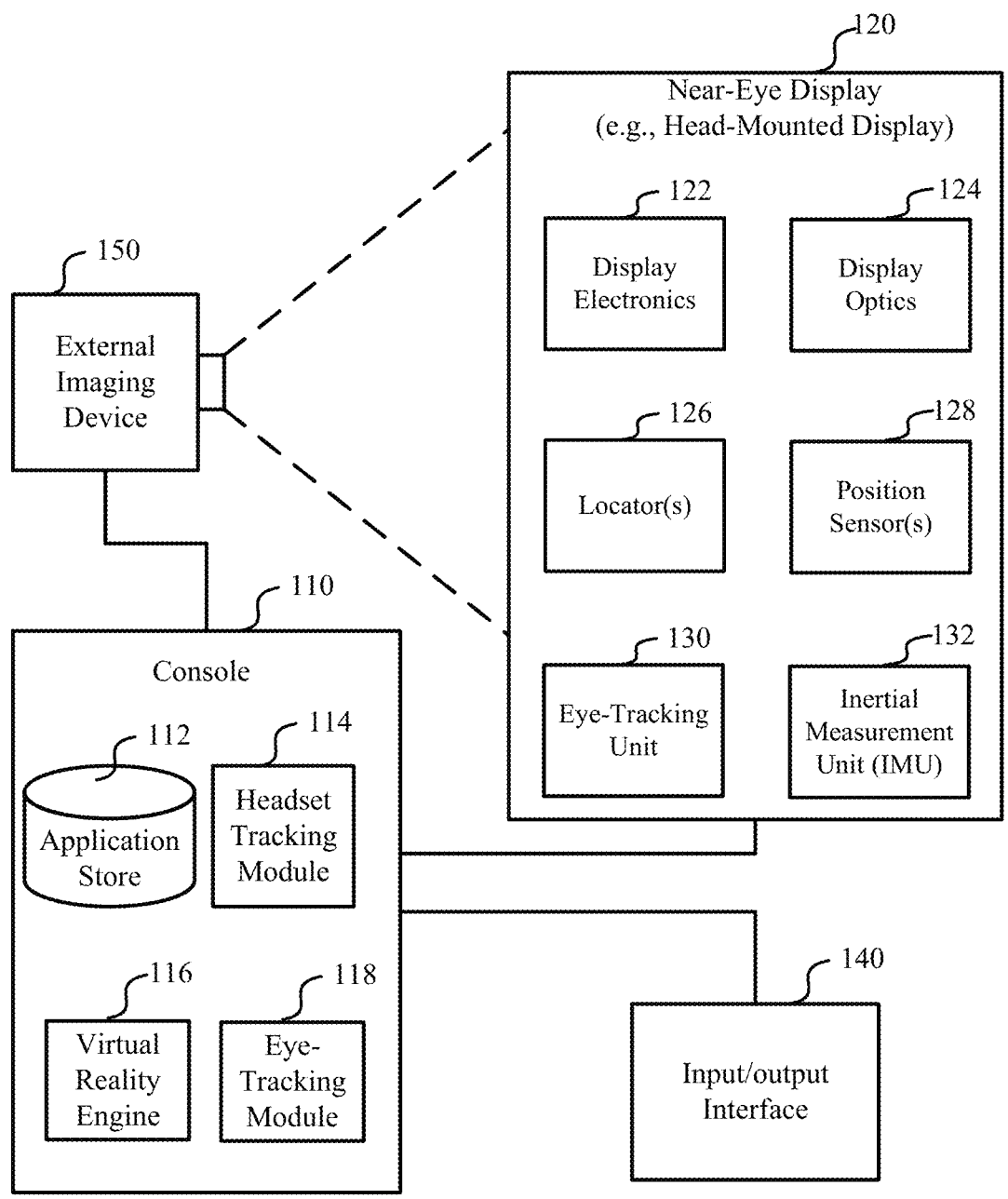
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to an artificial reality system, and more specifically, to an eye tracking subsystem for the artificial reality system.

In an artificial reality system, such as a virtual reality (VR), augmented reality (AR), or mixed reality (MR) system, to improve user interaction with presented content, the artificial reality system may track the user's eye, and modify or generate content based on a location or a direction in which the user is looking by. Tracking the eye may include tracking the position and/or shape of the pupil and/or the cornea of the eye, and determining the rotational position or gaze direction of the eye. To track the eye, an eye-tracking system of the near-eye display system may include an illumination subsystem that can illuminate the user's eye using light sources mounted to or inside the artificial reality system. The eye-tracking system may also include an imaging subsystem that includes an imaging device (e.g., a camera) for capturing light reflected by various surfaces of the user's eye. Light that is diffusively reflected (e.g., scattered) by, for example, the iris or pupil of the user's eye may affect the contrast of the captured image in the iris or pupil region, which may be used to determine the edges of the iris or pupil and the center of the pupil. Light that is reflected specularly off the cornea of the user's eye may result in "glints" in the captured image. Techniques such as the centroiding algorithm may be used to determine the locations of the glints on the eye in the captured image. For example, the centroiding algorithm may determine the center of the glint by finding the pixel location with the most energy in a local neighborhood. The rotational position (e.g., the gaze direction) of the eye may then be determined based on the locations of the glints relative to a known feature of the eye (e.g., the center of the pupil) within the captured image.

Existing eye-tracking systems may use light sources (e.g., infrared LEDs) positioned at the periphery of the user's field of view to illuminate the eye. The peripheral location of the light sources may negatively impact the accuracy of the eye tracking due to, for example, the angles of the illuminating light from the light sources to the eye or the angle of the light reflected from the eye. For example, depending on the placement of the camera (which may not be very flexible due to certain space constraints on the artificial reality system), light from a light source at a particular point may be reach the camera after being reflected by the cornea. While a larger number of light sources in the periphery of the user's field of view may help to increase the accuracy of eye tracking, increasing the number of light sources likely would cause a large amount of power consumption, especially for devices designed for extended use.

In-field illumination may offer greater eye tracking accuracy. For example, the probability of capturing glints off the cornea over all gaze angles of the eye is higher when the light sources are located within the field of the user. However, in-field illumination may have several challenges. For example, the light sources (e.g., LEDs) in the field of view of the user may affect the see-through quality of the real world images and the displayed images. In addition, the emission area of an LED may be fairly large (e.g., with a diameter of about 200 mm), and thus a light source used for eye illumination may be an extended source rather than a point source. Consequently, the glint may not appear as a point in the captured image, and the spatial structure within the emission area of the light source may be captured by the camera. The spatial structure captured in the image of the light source may cause errors when determining the relative location of the glint in the image using, for example, the centroiding algorithm. Other challenges may include power consumption and efficiency, light safety, robustness, etc.

According to certain embodiments of the eye-tracking system disclosed herein, a display of an artificial reality system includes a waveguide-based near-eye display system that includes one or more output couplers at different locations on the waveguide-based near-eye display. Light (e.g., IR light) for eye illumination may be coupled into the waveguide (e.g., a substrate) at a certain angle from a side or a surface of the waveguide (e.g., through a prism, a grating coupler, a slanted surface, etc.) such that the light can propagate within the substrate due to total internal reflection. Each of the output couplers can then couple at least a portion of the substrate-guided light out of the waveguide and towards the user's eye. In some embodiments, a one-dimensional or two-dimensional array of diffractive or holographic optical elements is used as the output couplers to couple light out of the waveguide and direct the light towards the user's eyes. The output couplers at different locations on the waveguide may have different parameters, such that the light coupled out of the waveguide from different locations on the waveguide can reach the user's eye from different directions. For example, by setting the parameters of the diffractive or holographic optical elements (e.g., chirped surface-relief gratings or holographic volume Bragg gratings), such as the pitches in various directions, tilting angles, duty cycles, refractive index modulations, etc., light may be coupled out of the waveguide by different chirped surface-relief gratings or holographic volume Bragg gratings (or different regions of a grating) at different diffraction angles and efficiencies towards the user's eye, thereby effectively creating multiple in-field point sources for eye illumination. For example, in some embodiments, the diffraction efficiency of an upstream output coupler may be lower than that of a downstream output coupler, such that the intensity of the light beam coupled out of the waveguide by each respective output coupler may be substantially equal. The gratings can be configured to transmit visible light and diffract infrared light, and thus may not affect the quality of the real world image or displayed image in front of the user's eye.

In some embodiments, multiple light beams may be coupled into the waveguide, where each light beam may be coupled out of the waveguide at multiple locations by a one-dimensional array of output coupler (e.g., chirped gratings). In some embodiments, a beam splitter, an optical fan-out device, or a one-dimensional array of gratings may split an incoming light beam into an array of light beams. Each light beam of the array of light beam may then be coupled out of the waveguide at multiple locations by a one-dimensional array of chirped gratings. In this way, a two-dimensional array of virtual light sources may be generated using a single input light beam.

In some embodiments, each output coupler (e.g., chirped surface-relief grating or holographic volume Bragg grating) may include multiple regions, where each region may have different parameters, such that each output coupler may generate a one-dimensional or two dimensional structured light pattern that illuminates the user's eye. In some embodiments, the output couplers may be used to couple light out of the waveguide, where the coupled light may interfere to generate an interference fringe pattern for illuminating the user's eye. In some embodiments, the interference fringe pattern can be used for fringe interferometry to measure, for example, the 3-D shape of the user's eye.

As used herein, visible light may refer to light with a wavelength between about 380 nm to about 750 nm. Near infrared (NIR) light may refer to light with a wavelength between about 750 nm to about 2500 nm. The desired infrared (IR) wavelength range may refer to the wavelength range of IR light that can be detected by a suitable IR sensor (e.g., a complementary metal-oxide semiconductor (CMOS) or a charge-coupled device (CCD) sensor), such as between 830 nm and 860 nm or between 930 nm and 980 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

As also used herein, a chirped grating may refer to a grating that is non-uniform across different regions or along different directions. For example, one or more parameters of a chirped grating, such as the grating period, tilt angle, refractive index variation, etc., may vary across the grating, such as being a function of the x and/or y coordinate.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive.

The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional external imaging device 150, and an optional input/output interface 140 that may each be coupled to an optional console 110. While FIG. 1 shows example artificial reality system environment 100 including one near-eye display system 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking unit 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (mLED) display, an active-matrix OLED display (AMOLED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122.

Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120/

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking unit 130 may include one or more eye-tracking systems. Eye tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

In some embodiments, eye-tracking unit 130 may include one light emitter and one camera to track each of the user's eyes. Eye-tracking unit 130 may also include different eye-tracking systems that operate together to provide improved eye tracking accuracy and responsiveness. For example, eye-tracking unit 130 may include a fast eye-tracking system with a fast response time and a slow eye-tracking system with a slower response time. The fast eye-tracking system may frequently measure an eye to capture data used by an eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking unit 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically. Because the foveal axis is defined according to the fovea, which is located in the back of the eye, the foveal axis may be difficult or impossible to measure directly in some eye tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking unit 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking unit due to, for example, a shift in the position of near-eye display system 120 on a user's head, may also be detected. Eye-tracking unit 130 may also detect the torsion of the eye and the rotation of the eye about the pupillary axis. Eye-tracking unit 130 may use the detected torsion of the eye to estimate the orientation of the foveal axis from the pupillary axis. In some embodiments, eye-tracking unit 130 may also track a change in the shape of the eye, which may be approximated as a skew or scaling linear transform or a twisting distortion (e.g., due to torsional deformation). In some embodiments, eye-tracking unit 130 may estimate the foveal axis based on some combinations of the angular orientation of the pupillary axis, the translation of the eye, the torsion of the eye, and the current shape of the eye.

In some embodiments, eye-tracking unit 130 may include multiple emitters or at least one emitter that can project a structured light pattern on all portions or a portion of the eye. The structured light pattern may be distorted due to the shape of the eye when viewed from an offset angle. Eye-tracking unit 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking unit 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking unit 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display system 120 for presentation to the user in accordance with information received from one or more of external imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback applications, or other suitable applications.

Headset tracking module 114 may track movements of near-eye display system 120 using slow calibration information from external imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100 using one or more calibration parameters, and may adjust one or more calibration parameters to reduce errors in determining the position of near-eye display system 120. For example, headset tracking module 114 may adjust the focus of external imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display system 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking unit 130.

Figure 2:
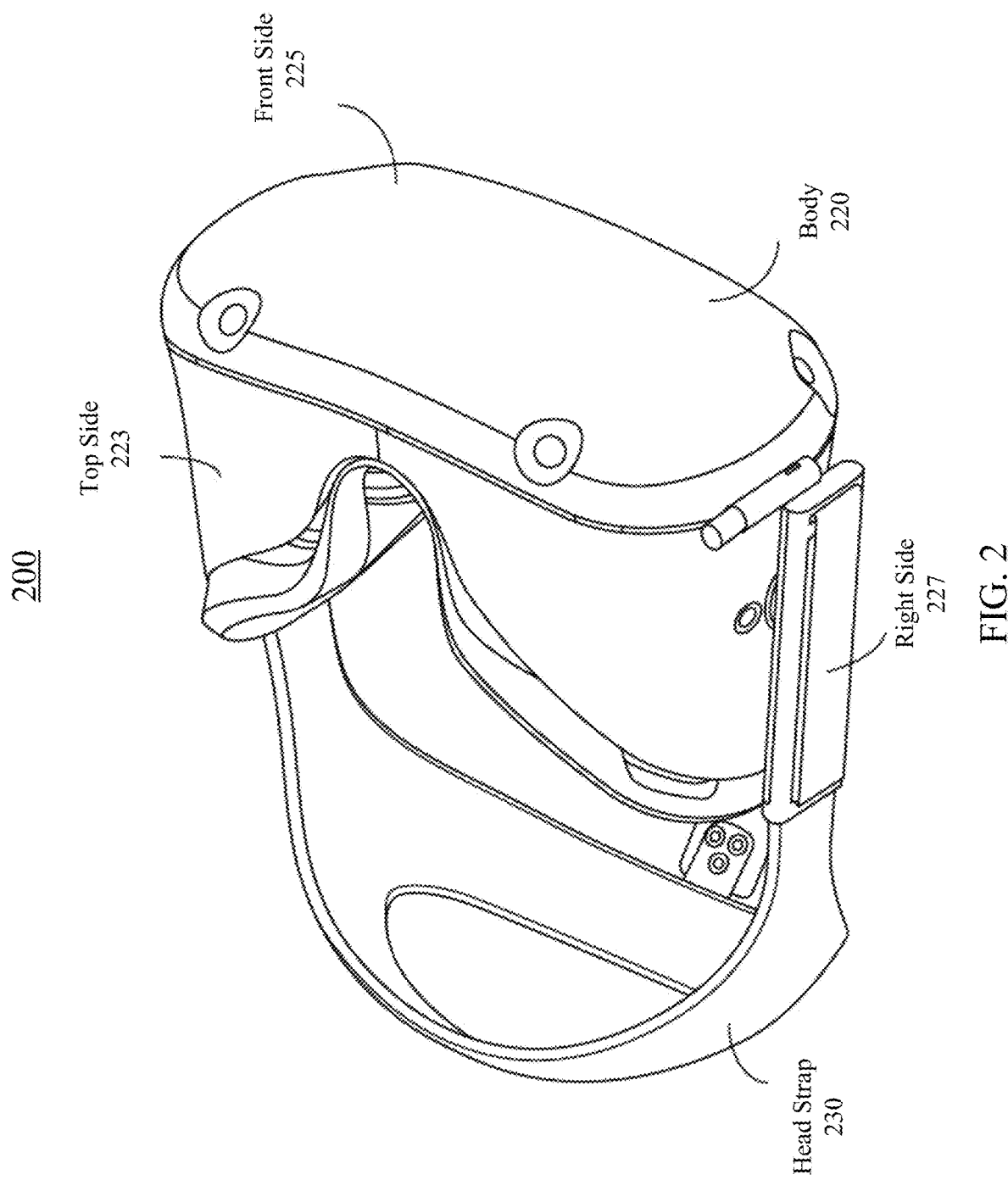
FIG. 2 is a perspective view of an example of a near-eye display system in the form of a head-mounted display (HMD) device for implementing some of the examples disclosed herein.

FIG. 2 is a perspective view of an example of a near-eye display system in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
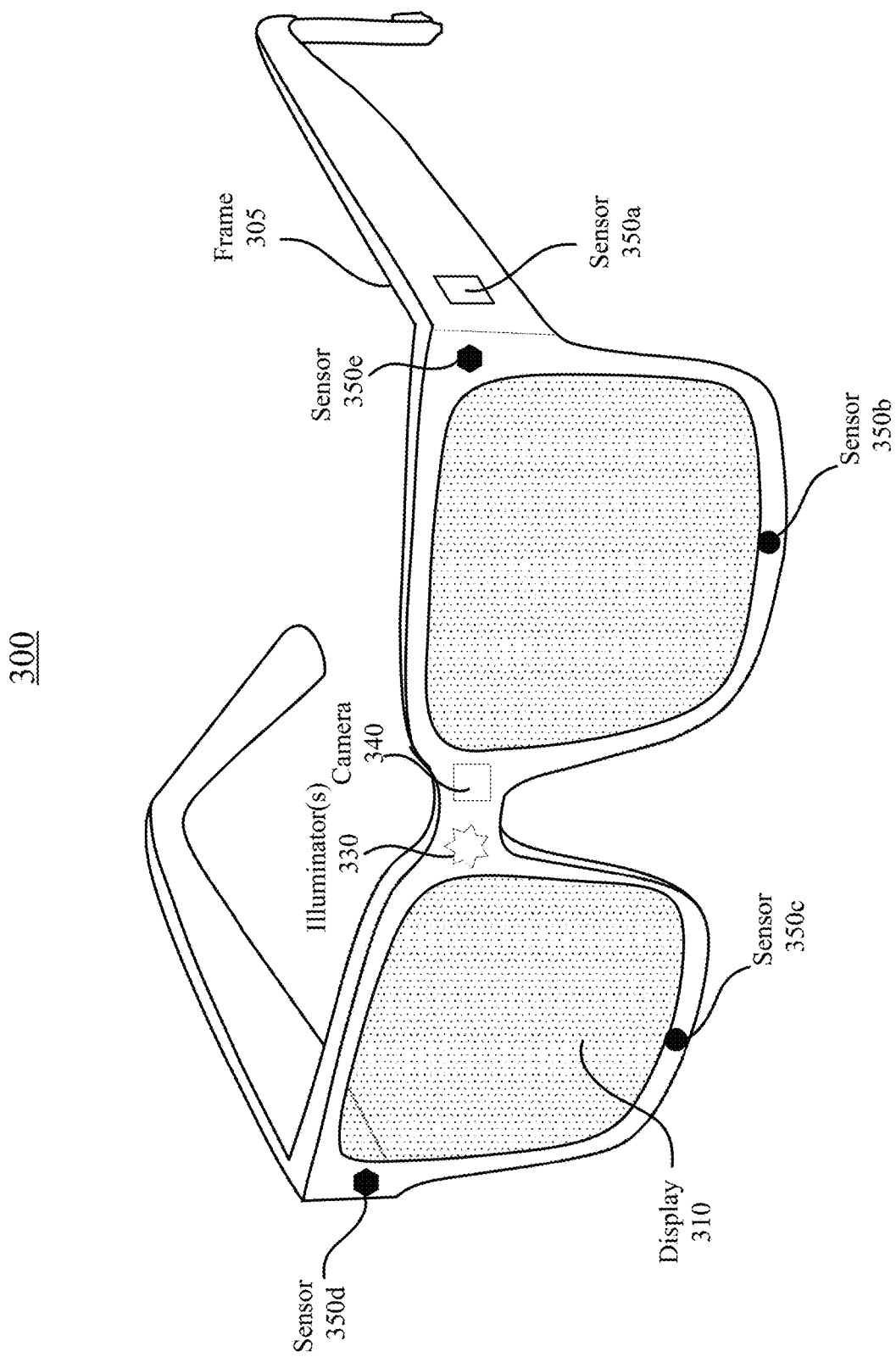
FIG. 3 is a perspective view of a simplified example of a near-eye display system in the form of a pair of glasses for implementing some of the examples disclosed herein.

FIG. 3 is a perspective view of a simplified example near-eye display system 300 in the form of a pair of glasses for implementing some of the examples disclosed herein. Near-eye display system 300 may be a specific implementation of near-eye display system 120 of FIG. 1, and may be configured to operate as a virtual reality display, an augmented reality display, and/or a mixed reality display. Near-eye display system 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display system 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display system 300, and/or to provide an interactive VR/AR/MR experience to a user of near-eye display system 300. In some embodiments, sensors 350a-350e may also be used for stereoscopic imaging.

In some embodiments, near-eye display system 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display system 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
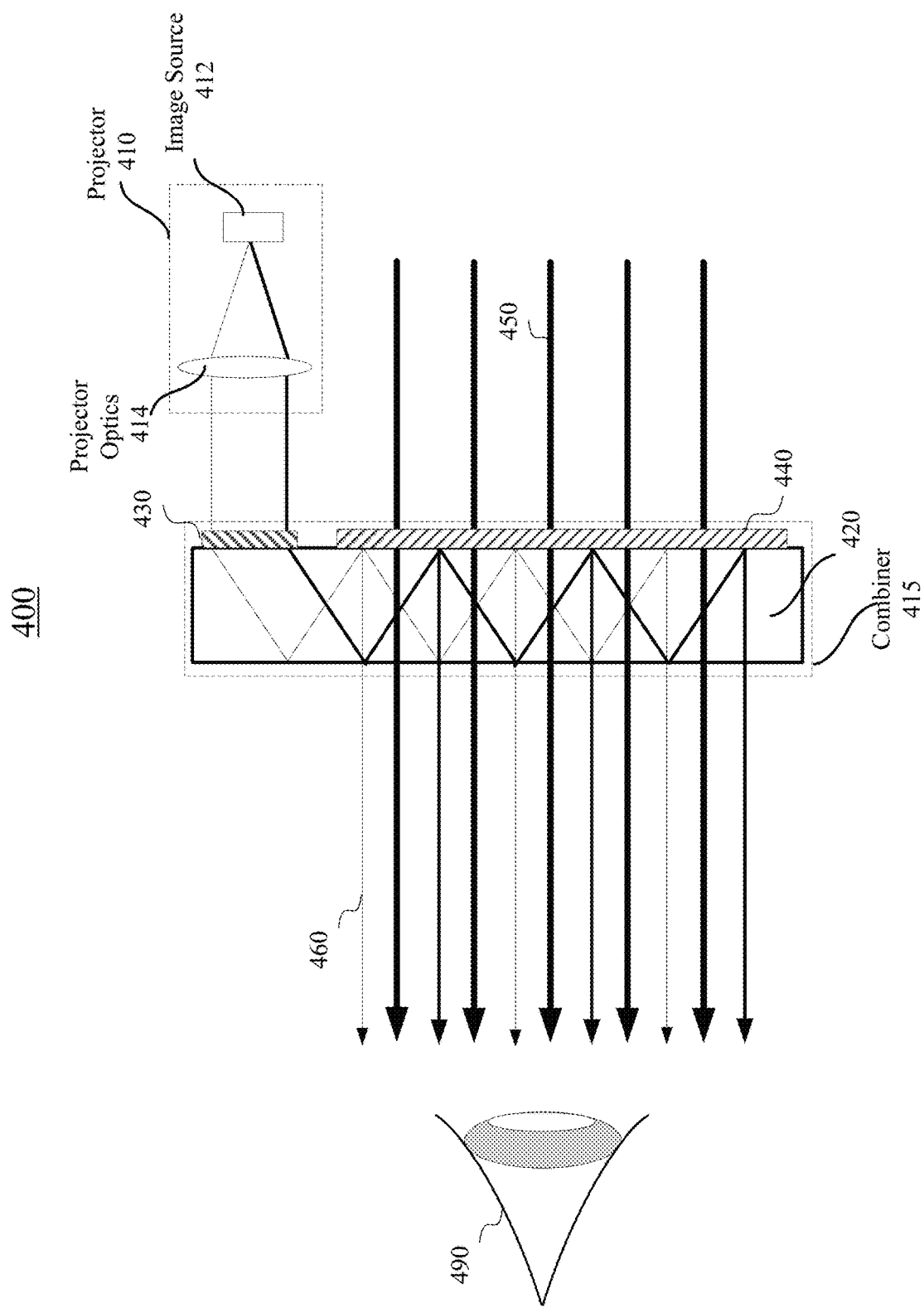
FIG. 4 illustrates an example of an optical see-through augmented reality system using a waveguide display according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical elements (DOE) (e.g., a surface-relief grating), a slanted surface of substrate 420, or a refractive coupler (e.g., a wedge or a prism). Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

Figure 5:
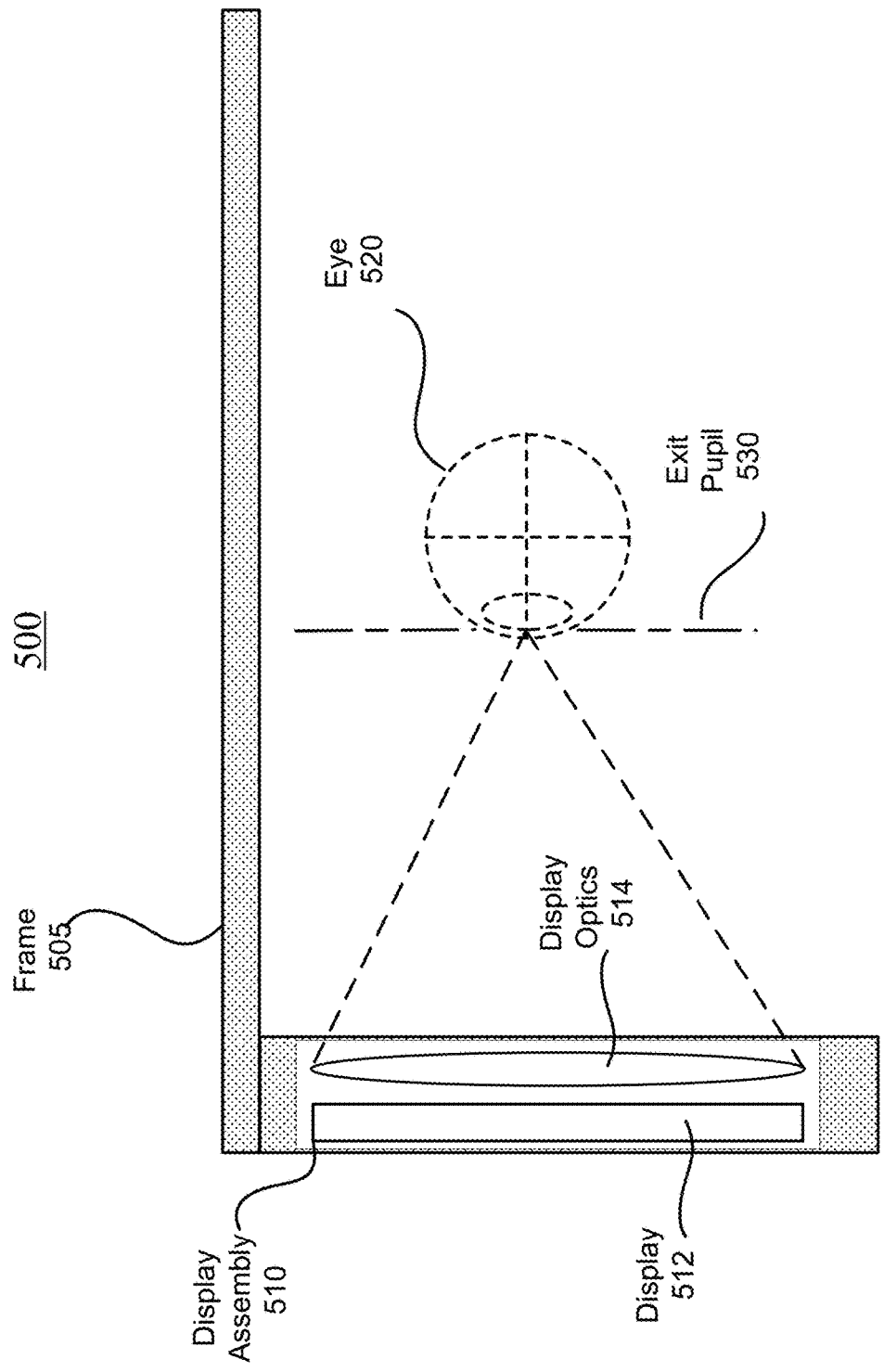
FIG. 5 is a cross-sectional view of an example of a near-eye display system according to certain embodiments.

FIG. 5 is a cross-sectional view of an example of a near-eye display system 500 according to certain embodiments. Near-eye display system 500 may include at least one display assembly 510. Display assembly 510 may be configured to direct image light (i.e., display light) to an eyebox located at exit pupil 530 of near-eye display system 500 and to user's eye 520. It is noted that, even though FIG. 5 and other figures in the present disclosure show an eye of a user of a near-eye display system for illustration purposes, the eye of the user is not a part of the corresponding near-eye display.

As HMD device 200 and near-eye display system 300, near-eye display system 500 may include a frame 505 and a display assembly 510 that includes a display 512 and/or display optics 514 coupled to or embedded in frame 505. As described above, display 512 may display images to the user electrically (e.g., using LCD) or optically (e.g., using an waveguide display and optical couplers as described with respect to FIG. 4) according to data received from a console, such as console 110. Display 512 may include sub-pixels to emit light of a predominant color, such as red, green, blue, white, or yellow. In some embodiments, display assembly 510 may include a stack of one or more waveguide displays including, but not restricted to, a stacked waveguide display, a varifocal waveguide display, etc. The stacked waveguide display may include a polychromatic display (e.g., a red-green-blue (RGB) display) created by stacking waveguide displays whose respective monochromatic sources are of different colors. The stacked waveguide display may also be a polychromatic display that can be projected on multiple planes (e.g. multi-planar colored display). In some configurations, the stacked waveguide display may be a monochromatic display that can be projected on multiple planes (e.g. multi-planar monochromatic display). The varifocal waveguide display is a display that can adjust a focal position of image light emitted from the waveguide display. In alternate embodiments, display assembly 510 may include the stacked waveguide display and the varifocal waveguide display.

Display optics 514 may be similar to display optics 124 and may display image content optically (e.g., using optical waveguides and optical couplers), correct optical errors associated with the image light, combine images of virtual objects and real objects, and present the corrected image light to exit pupil 530 of near-eye display system 500, where the user's eye 520 may be located at. Display optics 514 may also relay the image to create virtual images that appear to be away from the image source and further than just a few centimeters away from the eyes of the user. For example, display optics 514 may collimate light from the image source or project the displayed image to create a virtual image that may appear to be far away and convert spatial information of the displayed virtual objects into angular information. Display optics 514 may also magnify the image source to make the image appear larger than the actual size of the image source.

Figure 6:
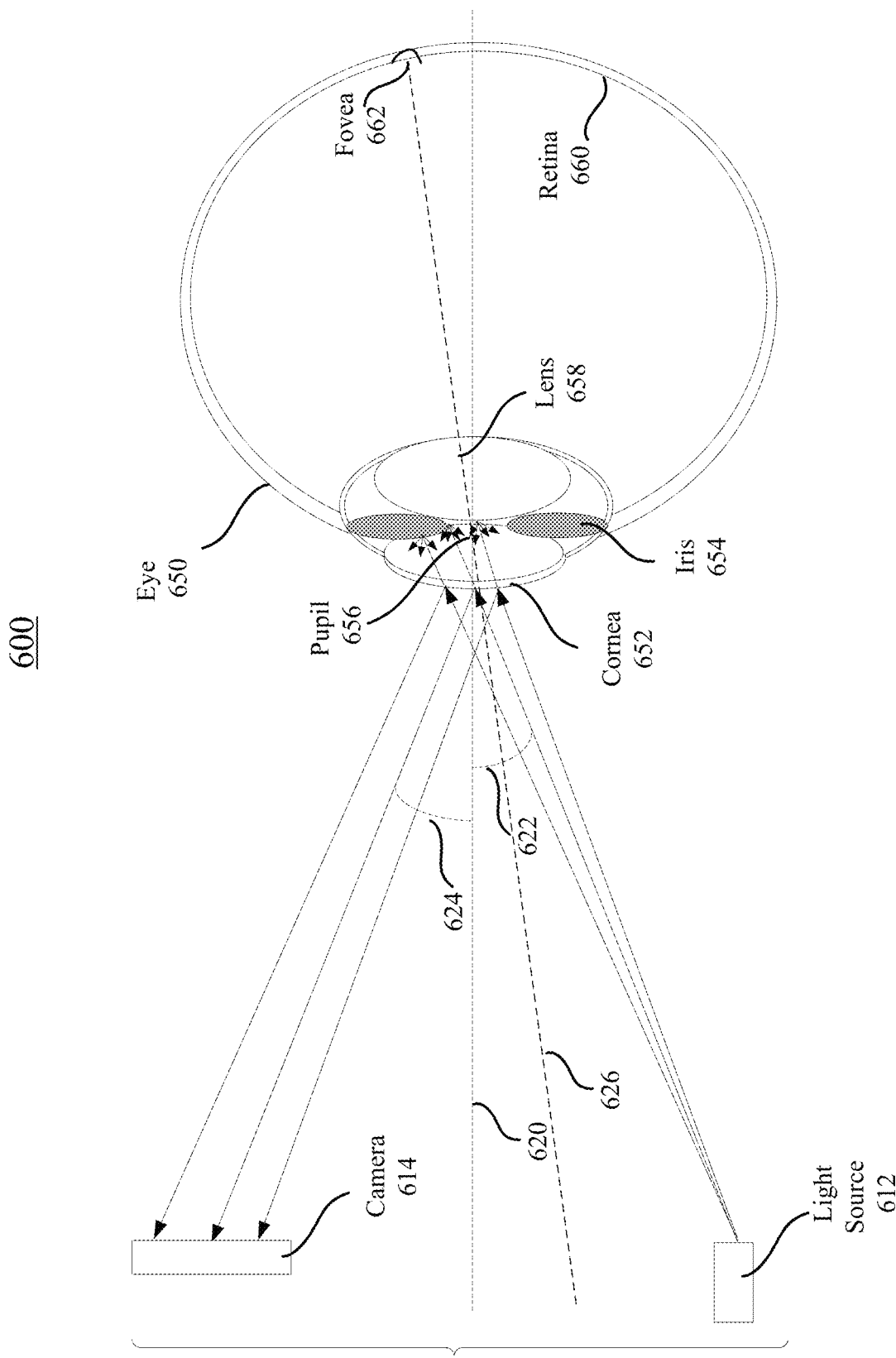
FIG. 6 illustrates light reflections and diffusions by an eye during eye tracking.

FIG. 6 illustrates light reflections and diffusions by an eye 650 during eye tracking using an eye-tracking unit 610, such as eye-tracking unit 130. Eye-tracking unit 610 may include a light source 612 and a camera 614 as described above. In other embodiments, eye-tracking unit 610 may include different and/or additional components than those depicted in FIG. 6. Light source 612 may include a laser and may be mounted at a laser angle 622 relative to a surface normal vector 620 of eye 650. Surface normal vector 620 is orthogonal to a portion of the surface (e.g., cornea 652) of eye 650 illuminated by light source 612. In the example shown in FIG. 6, surface normal vector 620 may be the same as the pupillary axis (a line passing through the center of pupil 656 and perpendicular to the surface of cornea 652) of eye 650. Laser angle 622 may be measured between surface normal vector 620 and a line from a center of the portion of the surface of eye 650 illuminated by light source 612 to a center of the output aperture of light source 612. Camera 614 may be mounted at a camera angle 624 relative to surface normal vector 620 of eye 650. Camera angle 624 may be measured between surface normal vector 620 and a line from a center of the portion of the surface of eye 650 illuminated by light source 612 to a center of the image sensor or light input aperture of camera 614. In some embodiments, a difference between laser angle 622 and camera angle 624 is less than a threshold amount so that camera 614 may capture images via specular reflections of light incident on cornea 652 of eye 650, which may beneficially increase contrast of the resulting image and minimize light power loss and power consumption.

The light emitted by light source 612 may substantially uniformly illuminate a portion of the eye surface (e.g., cornea 652). A portion of the emitted light may be reflected specularly by cornea 652 of eye 650 and captured by camera 614. In some cases, the light incident on eye 650 may propagate into the eye for a small distance before being reflected. At least some portions of the light may enter eye 650 through cornea 652 and reach iris 654, pupil 656, lens 658, or retina 660 of eye 650. Because some interfaces within eye 650 (e.g., surface of iris 654 or pupil 656) may be rough (e.g., due to features such as capillaries or bumps), the interfaces within eye 650 may scatter the incident light in multiple directions. Different portions of the eye surface and the interfaces within eye 650 may have different patterns of features. Thus, an intensity pattern of the light reflected by eye 650 may depend on the pattern of features within the illuminated portion of eye 650, which may allow identification of the portion of the eye (e.g., iris 654 or pupil 656) from the intensity pattern.

Camera 614 may collect and project light reflected by the illuminated portion of eye 650 onto an image sensor of camera 614. Camera 614 may also correct one or more optical errors (such as those described with respect to the display optics 124) to improve the contrast and other properties of the images captured by the image sensor of camera 614. In some embodiments, camera 614 may also magnify the reflected light. In some embodiments, camera 614 may enlarge the images. The image sensor of camera 614 may capture incident light focused by a lens assembly of camera 614. Thus, camera 614 may effectively capture an image of light source 612 (the emitted light of which is reflected specularly by the cornea of the eye) reflected by the eye, resulting in a "glint" in the captured image. Because of the scattering (diffusive reflections) at the interfaces of the eye, light incident on a point of the image sensor may include light reflected from multiple points within the illuminated portion of eye 650, and thus may be the result of the interference of the light reflected from the multiple points. Thus, in some embodiments, the image sensor of camera 614 may also capture a diffraction or speckle pattern formed by a combination of light reflected from multiple points of the surface of eye 650.

Each pixel of the image sensor may include a light-sensitive circuit that can output a current or voltage signal proportional to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 614 may include a complementary metal-oxide semiconductor (CMOS) pixel array, which may be used with laser light having a wavelength less than about 850 nm. As another example, the image sensor of camera 614 may include an indium gallium arsenide (InGaAs) alloy pixel array. Such an image sensor may be used with a laser emitting laser light having a wavelength between about 900 nm and about 1160 nm.

In some embodiments, to determine a position change of eye 650, an eye-tracking module (e.g., eye-tracking unit 130 or eye-tracking module 118 of FIG. 1) may determine a pixel shift between images. Multiplying the pixel shift by a calibrated distance per pixel may allow the eye-tracking module to determine a distance the surface (e.g., cornea 652) of eye 650 has shifted. For example, if the glint captured in one image is shifted by two pixels relative to the glint captured in a previous image, and each pixel corresponds to a distance of 10 micrometers at the surface of eye 650, the surface of eye 650 may have moved about 20 micrometers.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 650. For example, the eye-tracking module may determine the eye position by retrieving a reference eye position associated with the feature (which was also captured in a reference image), determining a pixel shift between the feature in the captured image and the feature in the reference image, and determining the eye position by modifying the reference eye position according to the determined pixel shift using the calibrated distance per pixel as described above.

As discussed above, camera 614 may effectively capture an image of light source 612 reflected by cornea 652 of eye 650. In some embodiments, the eye-tracking module may determine a gaze direction of the user's eye based on the locations of the images of the light sources (e.g., glints) on cornea 652 in the captured image. The gaze direction may be determined by foveal axes 626 of the user's eyes, where a foveal axis 626 may be a line passing through the center of pupil 656 and the center of fovea 662.

Figure 7:
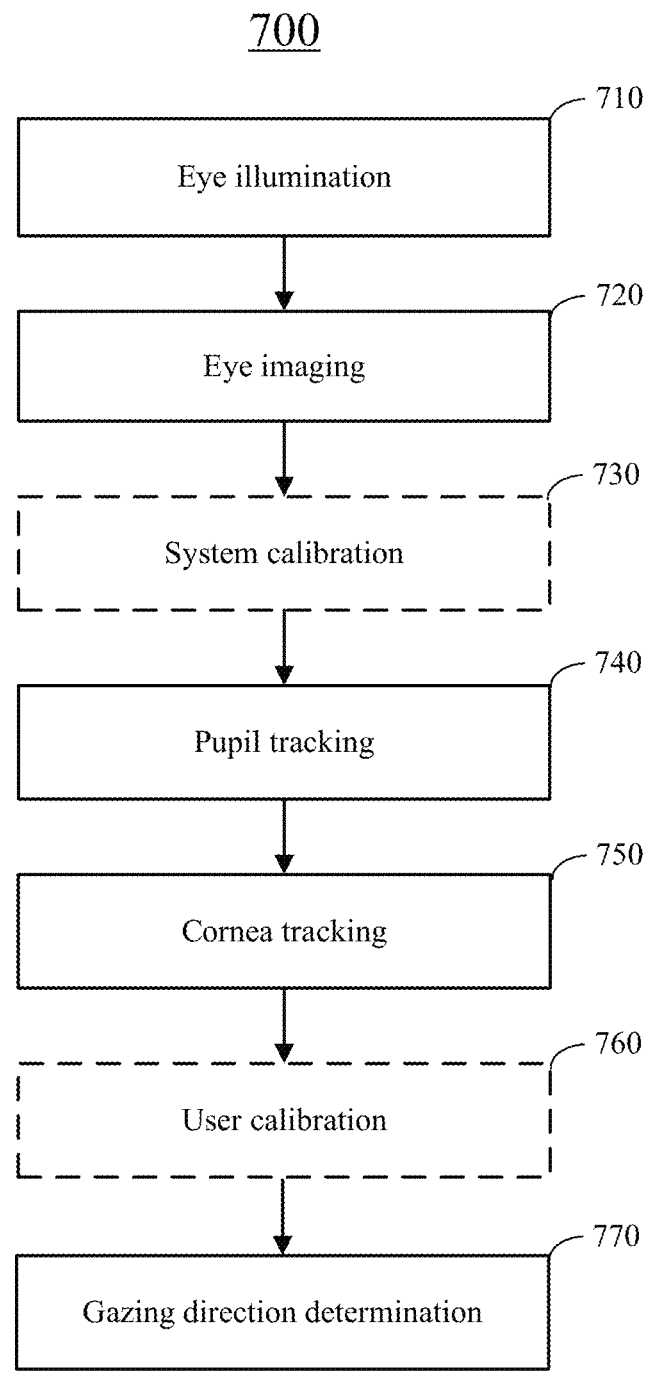
FIG. 7 is a simplified flow chart illustrating a method for tracking the eye of a user of a near-eye display system according to certain embodiments.

FIG. 7 is a simplified flow chart 700 illustrating a method for tracking the eye of a user of a near-eye display system according to certain embodiments. The operations in flow chart 700 may be performed by, for example, eye-tracking unit 130 described above. At block 710, one or more light sources may illuminate the user's eye. In various embodiments, the light sources may locate in the field of view of the user's eye or a peripheral of the field of view of the user's eye. In some embodiments, a light source may locate at the peripheral of the field of view of the user's eye, and the light from the light source may be guided and directed to the user's eye from locations in the field of view of the user's eye as described in more detail below.

At block 720, an imaging device (e.g., a camera) may collect light reflected by the user's eye and generate one or more images of the user's eye. As described above, the cornea of the user's eye may specularly reflect the illumination light, while some portions of the user's eye (e.g., iris) may diffusively scatter the illumination light. The images of the user's eye may include portions (e.g., the iris region and/or the pupil portion) where the contrast may be different due to the scattering of the illumination light. The images of the user's eye may also include glints caused by the specular reflection of the illumination light by the user's cornea.

Figures 8A, 8B:
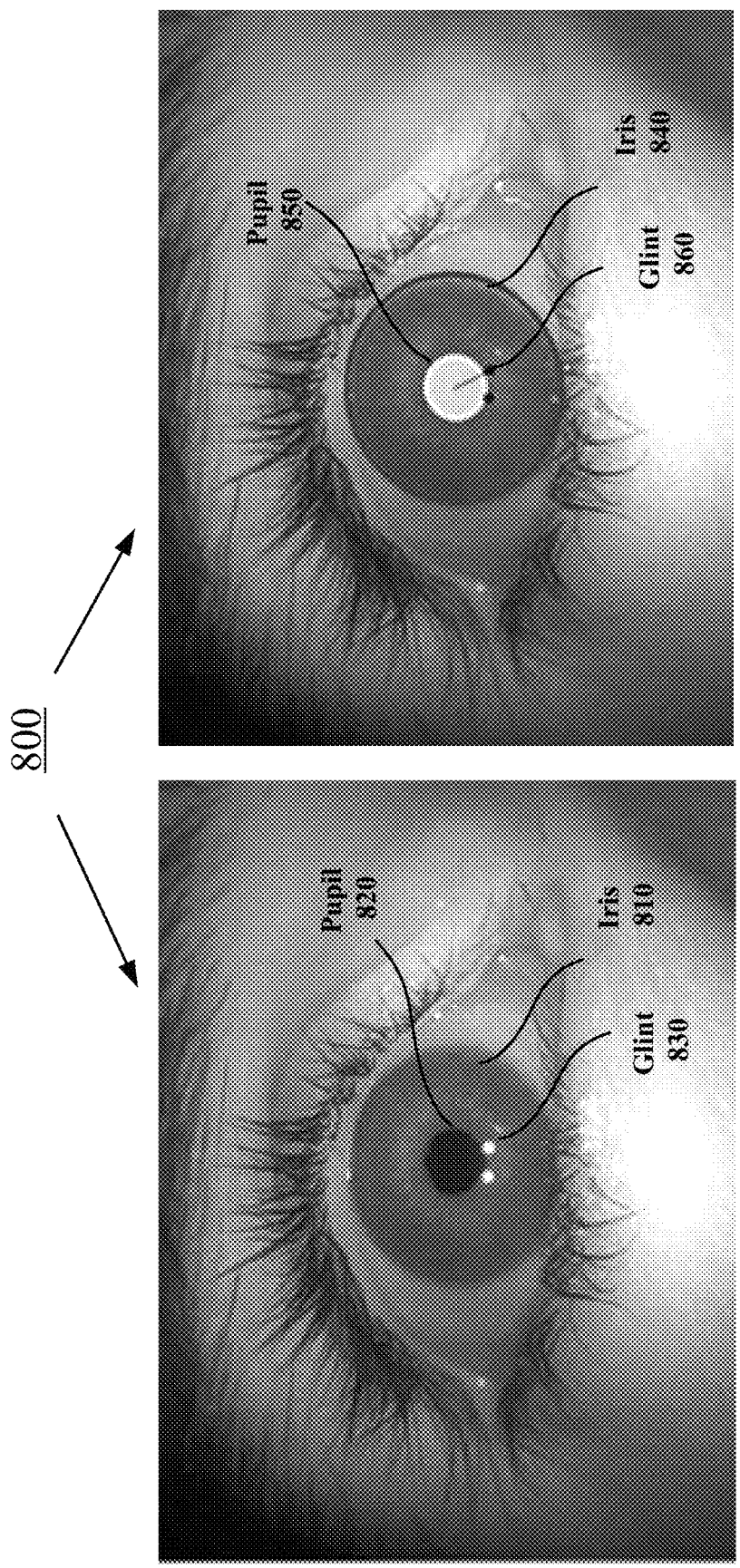
FIG. 8A illustrates an example of an image of a user's eye captured by a camera according to certain embodiments.
FIG. 8B illustrates an example of an identified iris region, an example of an identified pupil region, and examples of glint regions identified in an image of the user's eye according to certain embodiments.

FIG. 8A illustrates an example of an image 800 of a user's eye captured by a camera according to certain embodiments. Image 800 includes an iris region 810, a pupil region 820, and multiple glints 830. Glints 830 may be caused by illumination light specularly reflected off the cornea of the user's eye.

Optionally, at block 730, the eye-tracking unit may perform system calibration to improve the precision and accuracy of eye tracking as described above with respect to eye-tracking module 118. The system calibration may include, for example, calibrating a position of the near-eye display system or calibrating the intensity of illumination light and/or the light reflected by the eye to the camera.

At block 740, the location of the center of the pupil of the user's eye may be determined based on the scattering of the illumination light by, for example, the iris of the user's eye. As described above, the boundaries of the pupil and/or the iris may be determined based on image segmentation of the pupil region in the captured image as shown in FIG. 8A. Based on the boundaries of the pupil, the location of the center of the pupil may be determined.

At block 750, the position of the cornea of the user's eye may be determined based on the locations of the glints in the captured image of the user's eye as shown in FIG. 8A. As described above, the locations of the glints may be determined using, for example, a Gaussian centroiding technique. The accuracy and precision of the determined locations of the glints may depend on the locations of the light sources (or virtual or effective light sources). Based on the locations of two or more glints, the position of the center of the cornea may be determined using, for example, nonlinear optimization and based on the assumption that the cornea (in particular, the corneal apex) is close to a sphere.

FIG. 8B illustrates an example of an identified iris region 840, an example of an identified pupil region 850, and examples of glint regions 860 identified in image 800 of the user's eye according to certain embodiments. As illustrated, edges of iris region 840 and pupil region 850 are identified. The center of pupil region 820 may then be determined based on the edges of pupil region 850 and/or iris region 840. The locations of glints 830 can also be determined based on the locations of glint regions 860 identified in image 800. Based on the locations of glints 830 or glint regions 860, the position of the center of the cornea may be determined.

Optionally, at block 760, the eye-tracking unit may perform user calibration to determine certain eye calibration parameters for improving the precision and accuracy of eye tracking as described above with respect to eye-tracking module 118. Examples of eye calibration parameters may include an estimated distance between a component of the eye-tracking unit and one or more parts of the eye, such as the eye's center, pupil, cornea boundary, or a point on the surface of the eye. Other examples of the eye calibration parameters may include an estimated average eye radius, an average corneal radius, an average sclera radius, a map of features on the eye surface, and an estimated eye surface contour.

At block 770, the gaze direction of the user's eye may be determined based on the location of the center of the pupil and the position of the center of the cornea. For example, in some embodiments, the pupillary axis of the use's eye may be determined first and may then be used to determine the foveal axis (or line of sight or gaze direction) of the user's eye, for example, based on an angle between the pupillary axis and the foveal axis.

In many cases, the light source may be an extended source rather than a point source. Thus, the captured image (i.e., the glint) of light source 612 may have a shape of a circle, a rectangle, an oval, or an irregular shape that resembles the shape of the light source, and the spatial structure of light source 612 may be captured in the image. The extended shape of the glint and/or the spatial structure captured in the image of the light source may cause errors when determining the relative location of the glint in the image using, for example, the centroiding algorithm. The errors may affect the accuracy of eye tracking when the relative location (e.g., pixel shift) of the glint in the image is used to determine the corneal location in 3D space.

In addition, the peripheral location of light source 612 may negatively impact the accuracy of the eye tracking due to, for example, the angle of the illumination light from the light source to the eye and the angle of the reflected light with respect to the camera. For example, when the gaze angle of the eye changes, the reflected light may not be directed to the camera or may be directed to the camera at an extreme angle, which may reduce the accuracy of the eye tracking. In some cases, the light may be obstructed by facial features such as eye lids, eye lashes, etc., and thus may not be able to reach at least some portions or the whole area of the cornea (or iris) or the camera. Thus, in many implementations, multiple light sources and/or cameras in the periphery of the user's field of view may be used as shown in FIG. 3 in order to improve the accuracy of the eye tracking. For example, a ring of light sources may be placed around the circumference of display electronics and display optics. These light sources may illuminate the eye approximately uniformly and allow for segmentation of the pupil and the iris of the eye. In general, the greater the number of light sources, the better the accuracy of eye-tracking (approximately proportional to the square root of the number of light sources). However, it is not practical to use a large number of light sources because they may consume too much power and/or increase the bill of materials.

According to certain embodiments, an array of diffractive or holographic optical elements (DOEs or HOEs, such as chirped surface-relief gratings or volume holographic gratings) working in a wavelength range outside of the visible band may be fabricated on a waveguide (e.g., a transparent substrate) of a waveguide-based display as described above with respect to FIG. 4 to extract light from different locations of the waveguide. By tuning the parameters of the gratings, such as the pitch, angle, duty cycle, etc., light propagating within the waveguide may be coupled out of the waveguide at different locations and directed to the user's eye at different angles, thereby effectively creating multiple virtual point sources with different orientations at different locations (and thus multiple glints). In some embodiments, the cone of emission of the virtual point sources can also be controlled by tuning the parameters of the gratings. Since the diffractive gratings are generally wavelength selective, they can be made to be transparent in the visible band and be diffractive in a wavelength range outside of the visible band (e.g., infrared), and thus would not adversely affect the direct view of the physical world by the user through the near-eye display system or the view of the displayed image by the waveguide-based display.

Figure 9:
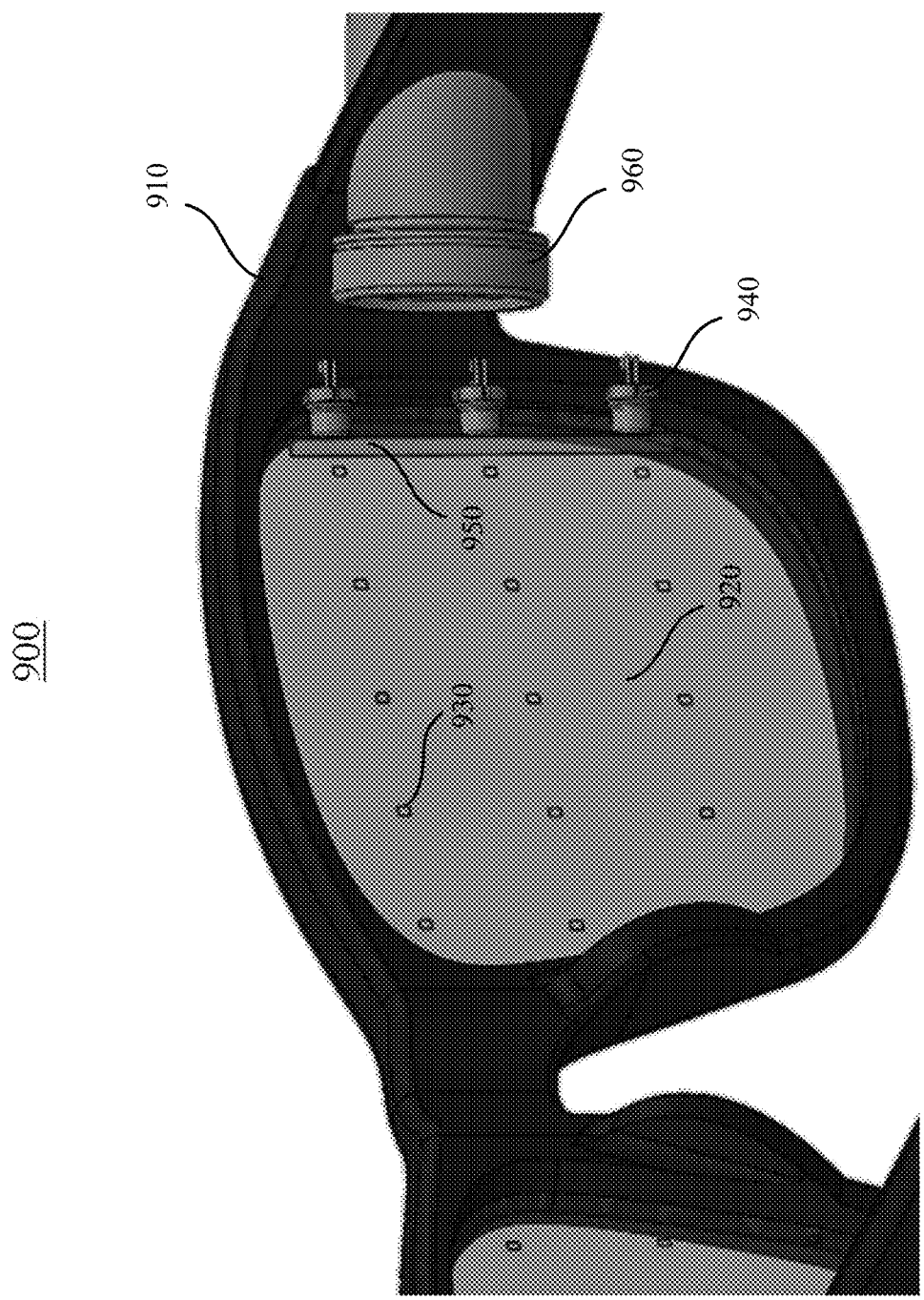
FIG. 9 illustrates an example of a near-eye display system in the form of a pair of glasses and including an example of an eye-tracking system according to certain embodiments.

FIG. 9 illustrates an example of a near-eye display system 900 in the form of a pair of glasses and including an example of an eye-tracking system according to certain embodiments. In the example, near-eye display system 900 is in the form of a pair of glasses that includes a frame 910 and two display panels 920. Display panels 920 may include transparent display panels, such as waveguide-based display panels described above with respect to FIG. 4. Each display panel 920 may include a substrate that is substantially transparent to visible light and light use for eye-tracking, such as infrared light.

The eye tracking system may include one or more light sources 940, one or more input coupler 950, one or more output couplers 930, and one or more cameras 960. Each light source 940 may include a light emitting device, such as an LED or a diode laser, that can emit light outside of visible band, such as infrared light. In some embodiments, light source 940 may include a lens for collimating or focusing light emitted from the light emitting device. In some embodiments, light source 940 may be mounted on frame 910 or embedded in frame 910. Light from light source 940 may be coupled into the substrate of display panel 920 by an input coupler 950, which may include, for example, a prism, a wedge, a slanted surface, or a grating.

Multiple output couplers 930 may be formed on display panel 920. In the example shown in FIG. 9, output couplers 930 may be distributed across display panel 920 and may form a two-dimensional array. Each output coupler 930 may include a HOE or DOE that is substantially transparent to visible light and can diffract light outside of the visible band (e.g., infrared light). Output coupler 930 may diffract infrared light such that infrared light incident on output coupler 930 may be at least partially coupled out of the substrate of display panel 920 and propagate at a direction towards a user's eye. In one example, each output coupler 930 may include a chirped surface-relief grating or volume holographic grating.

The light reached the user's eye may be at least partially reflected by the user's eye and reach camera 960 as described above with respect to FIG. 6. In some embodiments, the light reflected off the user's eye may directly reach camera 960. In some embodiments, the light reflected off the user's eye may be further reflected by some components on display panel 920 (e.g., Fresnel mirrors or hot mirrors) before reaching camera 960. Camera 960 may generate an image of the user's eye. As shown in FIG. 8A, the image may include a plurality of glints corresponding to output couplers 930 on display panel 920. The image may then be used to determine the gaze direction of the user's eye as described above with respect to FIG. 7 and FIG. 8B.

Figure 10:
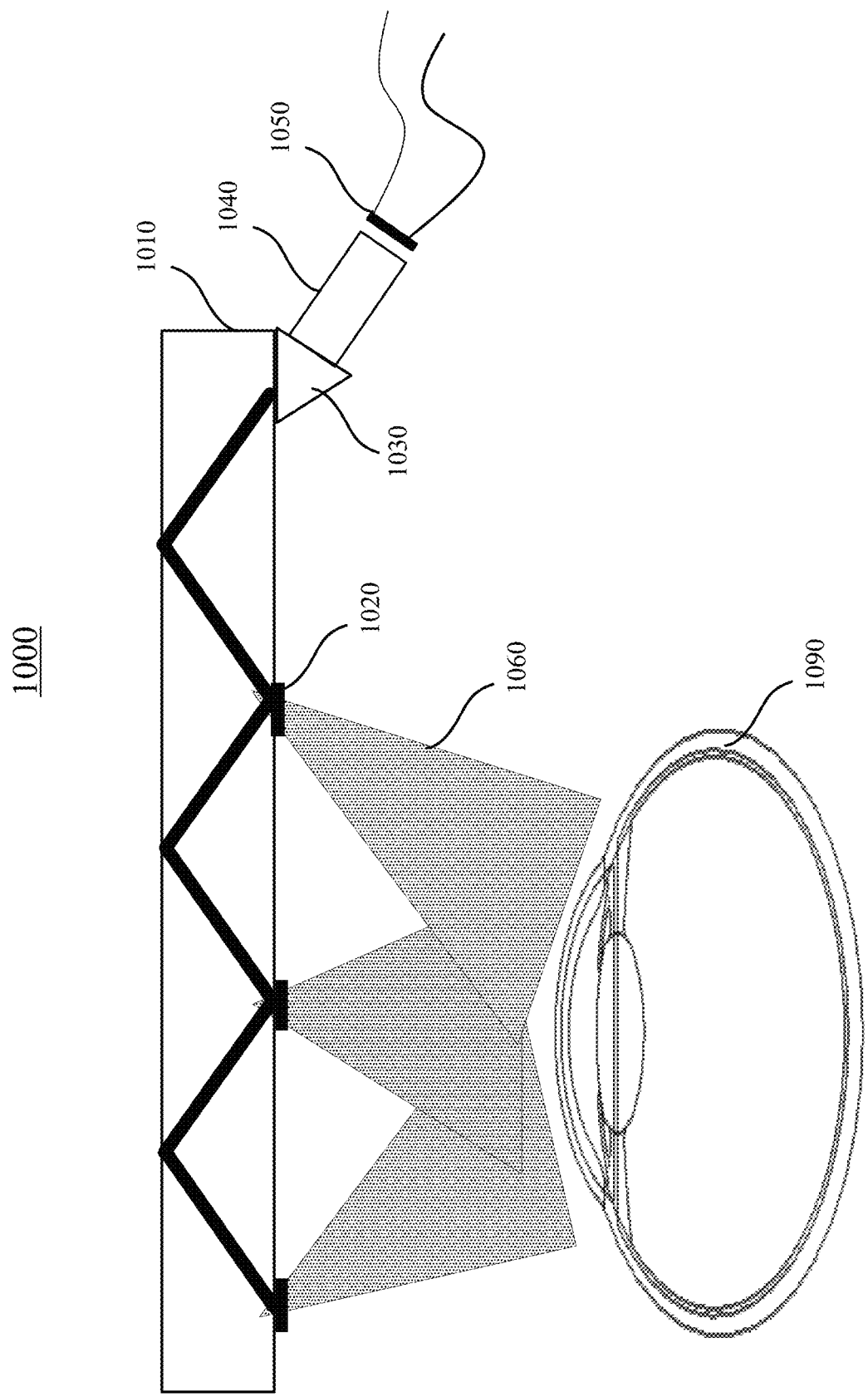
FIG. 10 is a cross-sectional view of an example of an eye-tracking system in an example of a near-eye display system according to certain embodiments.

FIG. 10 is a cross-sectional view of an example of an eye-tracking system in an example of a near-eye display system 1000, such as near-eye display system 900, according to certain embodiments. Near-eye display system 1000 includes a substrate 1010 of a display panel. Substrate 1010 may be substantively transparent to visible light and light used for eye-tracking, such as infrared light. Substrate 1010 may include flat or curved surfaces. An array of chirped surface-relief gratings or volume holographic gratings 1020 may be formed at a surface of substrate 1010. Each chirped surface-relief grating or volume holographic grating 1020 may have different grating parameters, such as pitches and tilted angles.

Light emitted from a light source 1050 (e.g., an LED, LD, VCSEL or some other monochromatic or coherent light source) may be collimated by a lens 1040 and may then be coupled into substrate 1010 by a prism 1030. The light coupled into substrate 1010 may propagate within substrate 1010 due to total internal reflection. When the substrate-guided light reaches a chirped surface-relief grating or volume holographic grating 1020, it may be at least partially diffracted out of substrate 1010 as an illumination light beam 1060 towards a user's eye 1090. Other portions of the substrate-guided light may be reflected at the surface and continue to propagate within the substrate, and may then be coupled out of substrate 1010 by other chirped surface-relief grating or volume holographic grating 1020 located at other locations on the substrate. The chirped surface-relief gratings or volume holographic gratings may be configured such that all light coupled out of substrate 1010 is directed to user's eye 1090. In some embodiments, different chirped surface-relief gratings or volume holographic gratings may have different diffraction efficiencies such that illumination light beams 1060 may have similar intensities.

Figure 11B:
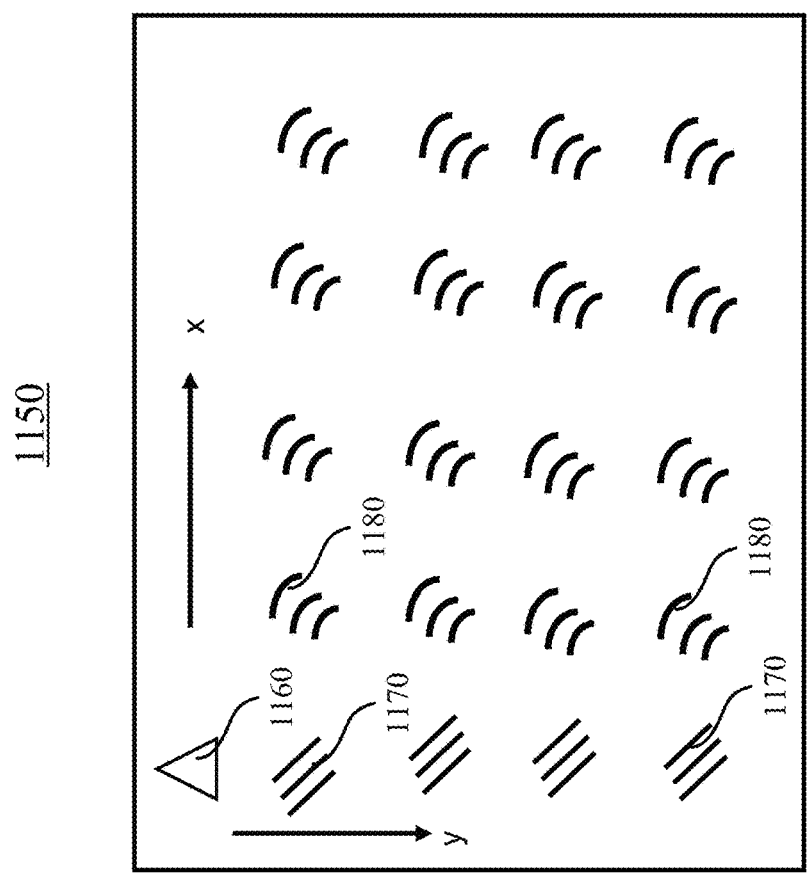
FIG. 11B illustrates another example of a substrate including an input coupler and output couplers near-eye display system according to certain embodiments.
Figure 11A:
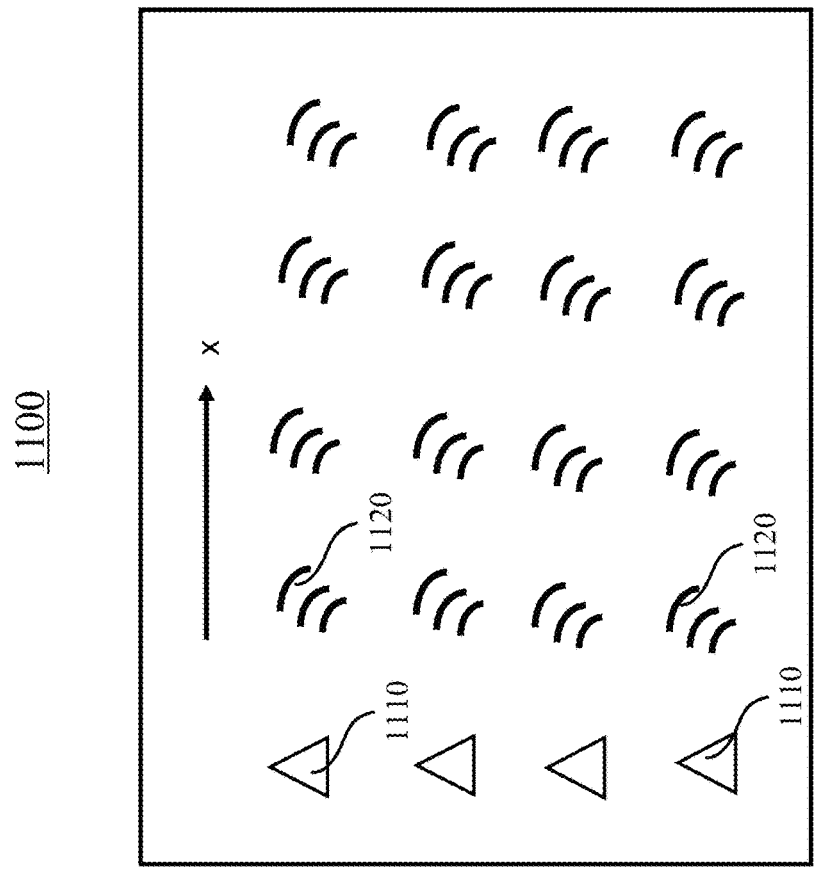
FIG. 11A illustrates an example of a substrate including input and output illumination light couplers near-eye display system according to certain embodiments.

FIG. 11A illustrates an example of a substrate 1100 including input and output illumination light couplers near-eye display system according to certain embodiments. As illustrated, substrate 1100 includes a one-dimensional array of input couplers 1110 and a two dimensional array of output couplers 1120. Each input coupler 1110 may align with a one-dimensional array of output couplers 1120 in the x direction. Each input coupler 1110 may couple a light beam from a light source (e.g., an LED or a laser diode) into substrate 1100 at an angle greater than a threshold value (e.g., the critical angle). Thus, light coupled into substrate 1100 may propagate in the x direction within the substrate through total internal reflection. Output couplers 1120 may be arranged at locations where light propagating within the substrate may reach the surface of the substrate, and may couple a fraction of the light out of the substrate towards the user's eye as shown in FIG. 10.

FIG. 11B illustrates another example of a substrate 1150 including an input coupler 1160 and output couplers 1180 near-eye display system according to certain embodiments. An illumination light beam from a light source may be coupled into substrate 1150 by input coupler 1160. The illumination light may propagate within the substrate in the y direction through total internal reflection. A portion of the illumination light may be diverted by a grating 1170 (or a partial reflector) on the propagation path to propagate in the x direction, while other portions of the illumination light may continue to propagate in the y direction and may be diverted by other gratings 1170 to propagate in the x direction. In some embodiments, input coupler 1160 may split illumination light beam from a light source and direct the split illumination light beams towards gratings 1170, which may then divert the illumination light beams such that each illumination light beam may propagate within the substrate in the x direction. The illumination light propagating in the x direction may be extracted out of the substrate a portion at a time by output couplers 1180 as described above with respect to FIGS. 10 and 11A. In this way, one light source may be used to generate a two-dimensional array of light beams towards the user's eye.

Figure 12:
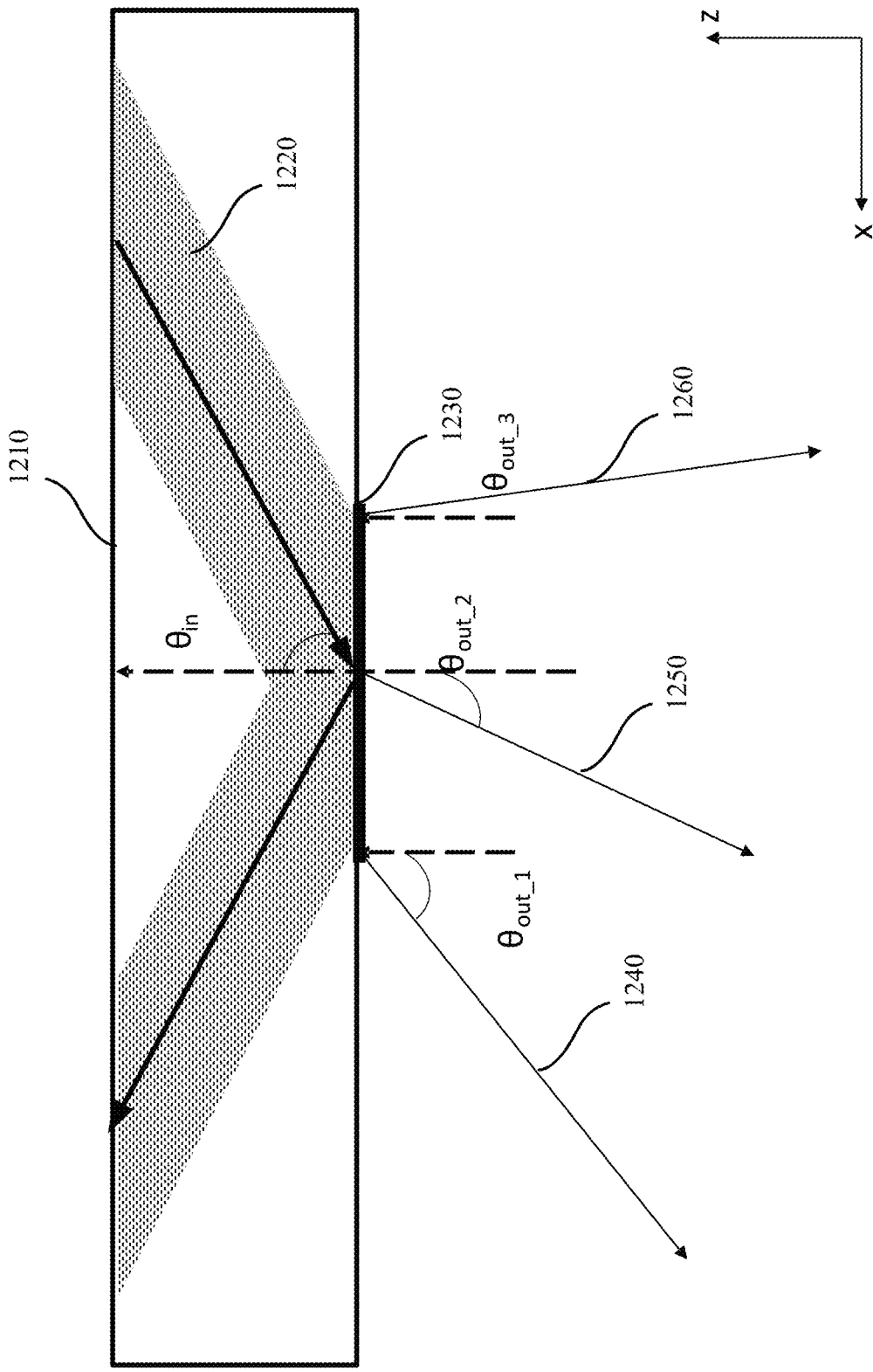
FIG. 12 illustrates light diffraction by an example of a chirped surface-relief grating coupler according to certain embodiments.

FIG. 12 illustrates light diffraction by an example of a chirped surface-relief grating coupler 1230 according to certain embodiments. Chirped surface-relief grating coupler 1230 may be located at a surface of a substrate 1210. A light beam 1220 may propagate within substrate 1210 through total internal reflection and may reach chirped surface-relief grating coupler 1230. Chirped surface-relief grating coupler 1230 may have a dimension equal to or greater than a dimension of light beam 1220, such as, for example, a length or a diameter of 800 µm. Because chirped surface-relief grating coupler 1230 may have different pitches at different locations, light diffracted out of substrate 1210 by different portions of chirped surface-relief grating coupler 1230 may propagate at different angles determined by the following diffraction (grating) equation:

$$\text{pitch}(x) = \frac{\lambda}{n_{wg}(\sin\theta_{in} - \sin\theta_{out}(x))},$$

where pitch(x) is the pitch of the chirped surface-relief grating at location x, $\lambda$ is the wavelength of the illumination light, $n_{wg}$ is the refractive index of the substrate, $\theta_{in}$ is the incident angle of light beam 1220 on chirped surface-relief grating coupler 1230, and $\theta_{out}(x)$ is the diffraction angle of the first order diffraction at location x. For example, light beam 1240 may be diffracted out of substrate 1210 at an output angle $\theta_{out\_1}$, light beam 1250 may be diffracted out of substrate 1210 at an output angle $\theta_{out\_2}$, and light beam 1260 may be diffracted out of substrate 1210 at an output angle $\theta_{out\_3}$, where output angles $\theta_{out\_1}$, $\theta_{out\_2}$, $\theta_{out\_3}$ may be different from each other.

FIG. 12 shows the directions of the diffracted beams in the x-z plane. In the three-dimensional (xyz) space, the direction of the diffracted beam can be determined by the grating pitch in the x direction ($P_x$, which determines the tilt in the x-direction) and the grating pitch in the y direction ($P_y$, which determines the tilt in the y-direction). In other words, the tilt angle of the diffracted beam may be a function of the tilt angle of the chirped surface-relief grating in the x-y plane.

Figure 13:
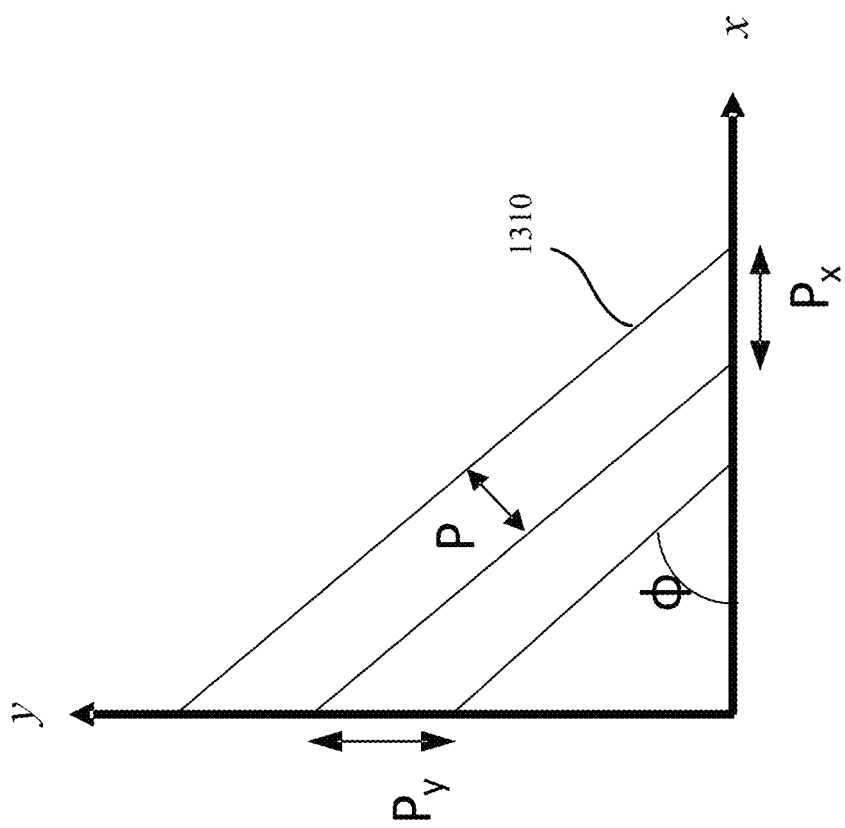
FIG. 13 illustrates some grating parameters of an example of a chirped surface-relief grating coupler according to some embodiments.

FIG. 13 illustrates some grating parameters of an example of a chirped surface-relief grating coupler 1310 according to some embodiments. As shown in FIG. 13, chirped surface-relief grating coupler 1310 may have a pitch (or period) $P_x$ in the x direction at a given x location, and a pitch (or period) $P_y$ in the y direction at a given y location. The pitch P of chirped surface-relief grating coupler 1310 may be determined by:

$$\frac{1}{P^2} = \frac{1}{P_x^2} + \frac{1}{P_y^2},$$

and the tilt angle $\phi$ of chirped surface-relief grating coupler 1310 in the x-y plane may be determined by:

$$\tan(\phi) = \frac{P_y}{P_x}.$$

The angle of the diffracted light along the x and y directions may be determined by $P_x$ and $P_y$ respectively, based on the diffraction (grating) equation described above. Thus, the desired direction of a diffracted beam in the three-dimensional space may be achieved by tuning $P_x$ and $P_y$. As illustrated in FIG. 12, the tilt angle of the diffracted beam may be a function of a location (e.g., x and y coordinates) on the chirped surface-relief grating coupler. Thus, the tilt angle and pitch of a chirped surface-relief grating coupler may vary across the area of the chirped surface-relief grating.

Figure 14A:
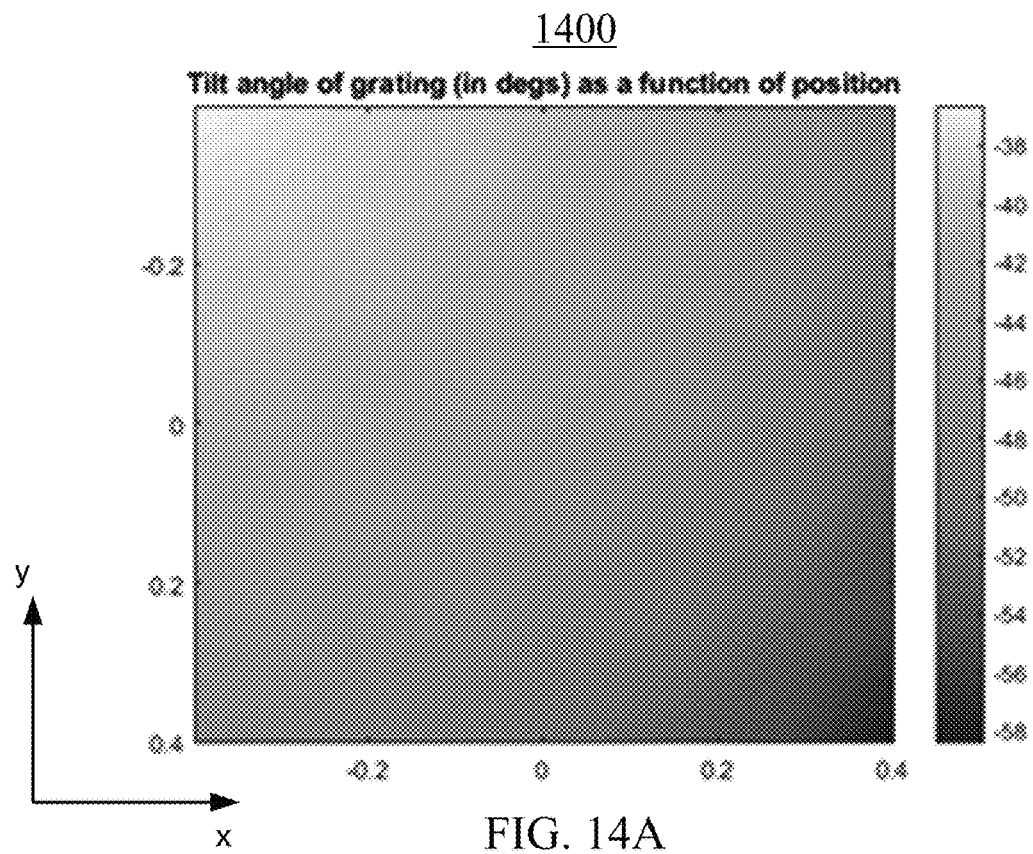
FIG. 14A illustrates the variation of the tilt angle of an example of a chirped surface-relief grating according to certain embodiments.

FIG. 14A illustrates the variation of the tilt angle $\phi$ of an example of a chirped surface-relief grating 1400 according to certain embodiments. Chirped surface-relief grating 1400 may have dimensions of 0.8 mm×0.8 mm in the x-y plane. The tilt angle $\phi$ changes gradually in both the x direction and the y direction. In the example, the tilt angle may range from about 35° to about 60°.

Figure 14B:
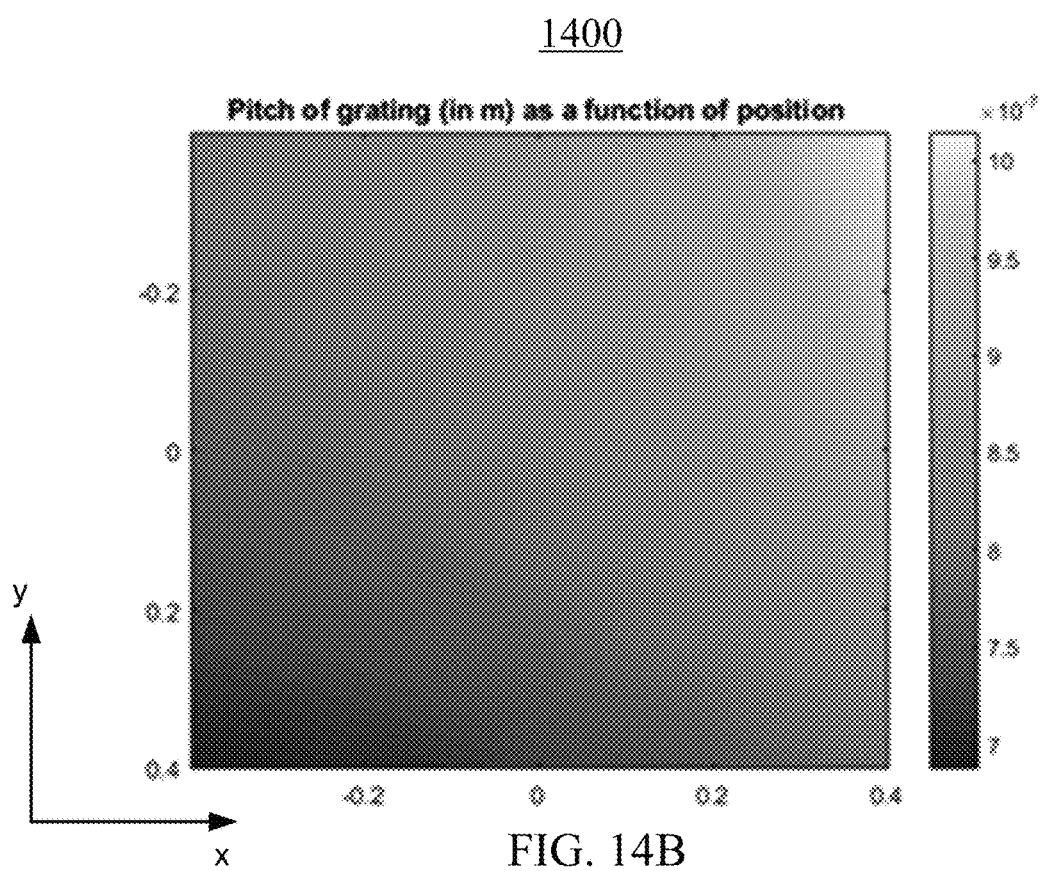
FIG. 14B illustrates the variation of the pitch of chirped surface-relief grating according to certain embodiments.

FIG. 14B illustrates the variation of the pitch P of chirped surface-relief grating 1400 according to certain embodiments. As shown in FIG. 14B, the pitch P of chirped surface-relief grating 1400 changes gradually in both the x direction and the y direction. In the example, the pitch P may range from about 0.7 µm to about 10 µm over the 0.8 mm×0.8 mm region.

As described above, the illumination light from a light source may be coupled into the substrate of a display panel (which functions as a waveguide for the coupled light) in various ways. For example, in some embodiments as shown in FIG. 10, the illumination light from a light source may be coupled into the substrate through a prism. In other embodiments, the illumination light from a light source may be coupled into the substrate by a grating coupler.

Figure 15:
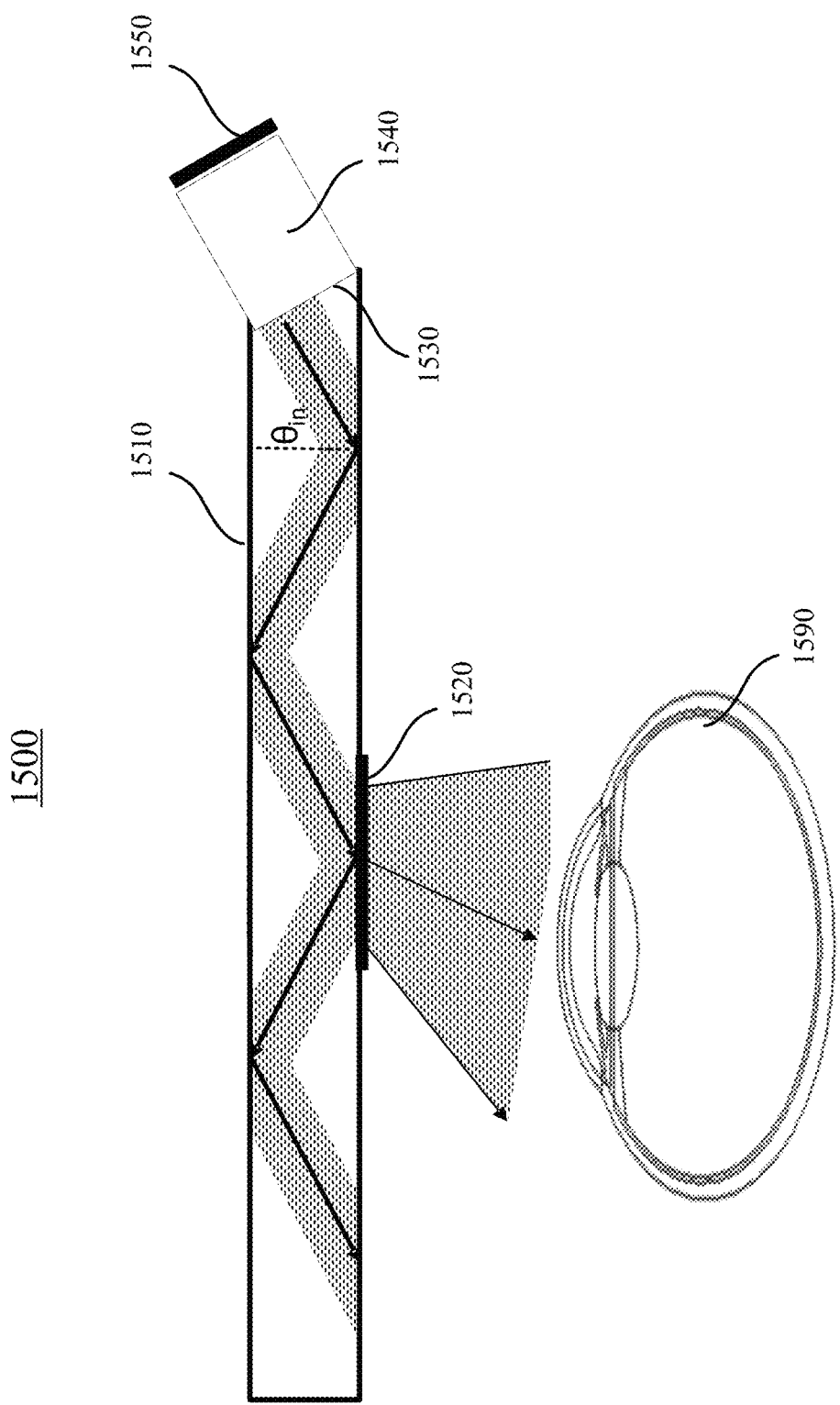
FIG. 15 illustrates another example of an eye-tracking system in a near-eye display system according to certain embodiments.

FIG. 15 illustrates an example of an eye-tracking system 1500 in a near-eye display system according to certain embodiments. Illumination light from a light source 1550 may be collimated by a lens 1540 and coupled into a substrate 1510 of eye-tracking system near-eye display system 1500 from a slanted surface 1530 of substrate 1510. The slanted surface 1530 may be configured such that angle $\theta_{in}$ is equal to or greater than the critical angle of substrate 1510. The illumination light coupled into substrate 1510 may then propagate within substrate 1510 and may be extracted out of substrate 1510 by an output coupler 1520 (e.g., a chirped surface-relief gratings or volume holographic grating) and directed to a user's eye 1590 as described above. In some embodiments, substrate 1510 may include a slanted reflective edge coated with a reflective material and light from light source 1550 may enter substrate 1510 surface-normally from a surface of the substrate, and may be incident on the slanted reflective edge and may be reflected by the slanted reflective edge at an angle such that the reflected light may propagate within substrate 1510 through total internal reflection.

It is noted that even though FIGS. 10 and 15 show that the output couplers (e.g., chirped surface-relief grating or volume holographic grating couplers) are located on a surface of the substrate that is close to the user's eye, in some embodiments, the output couplers may be formed on a surface of the substrate opposite to the user's eye. In some embodiments, the output couplers may be formed on two opposite surfaces of the substrate.

In many cases, it may be desirable to project a structured light pattern that includes a one-dimensional array or two-dimensional array of light spots on the user's eyes for more accurate and precise eye-tracking. For example, the structured light pattern may help to more accurately and precisely determine the shape and position of the user's eye. In some embodiments, a known light pattern can be projected onto an object (such as a user's eye or face), and, by measuring the deformed pattern and determining the changes between the projected pattern and the deformed pattern, a vision system can determine the depth, movement, etc. of the object (e.g., the user's eye). The structured light pattern can have various shapes, textures, and periods.

In the near-eye display system described above, the number of light spots projected on the user's eye may depend on the number of output couplers on the substrate, while the number of output couplers on the substrate may depend on the length, width, thickness, and critical angle of the substrate (and thus the number of bounces within the substrate). Thus, the number of light spots projected on the user's eye may be limited. According to certain embodiments, each chirped surface-relief grating coupler described above may include multiple sections, where each section may be configured to project a light spot on the user's eye. Thus, the array of chirped surface-relief grating couplers may each project multiple spots on the user's eye to increase the total number of light spots that can be projected on the user's eye and hence the overall number of glints in the captured image of the user's eye.

Figure 16B:
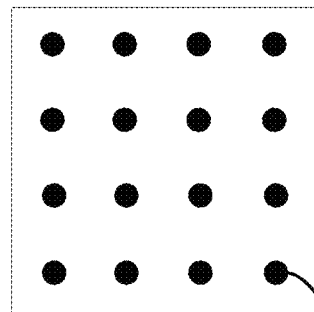
FIG. 16B illustrates an example of a structured light pattern generated in the far field by an example of a chirped surface-relief grating coupler that includes multiple sections according to certain embodiments.
Figure 16A:
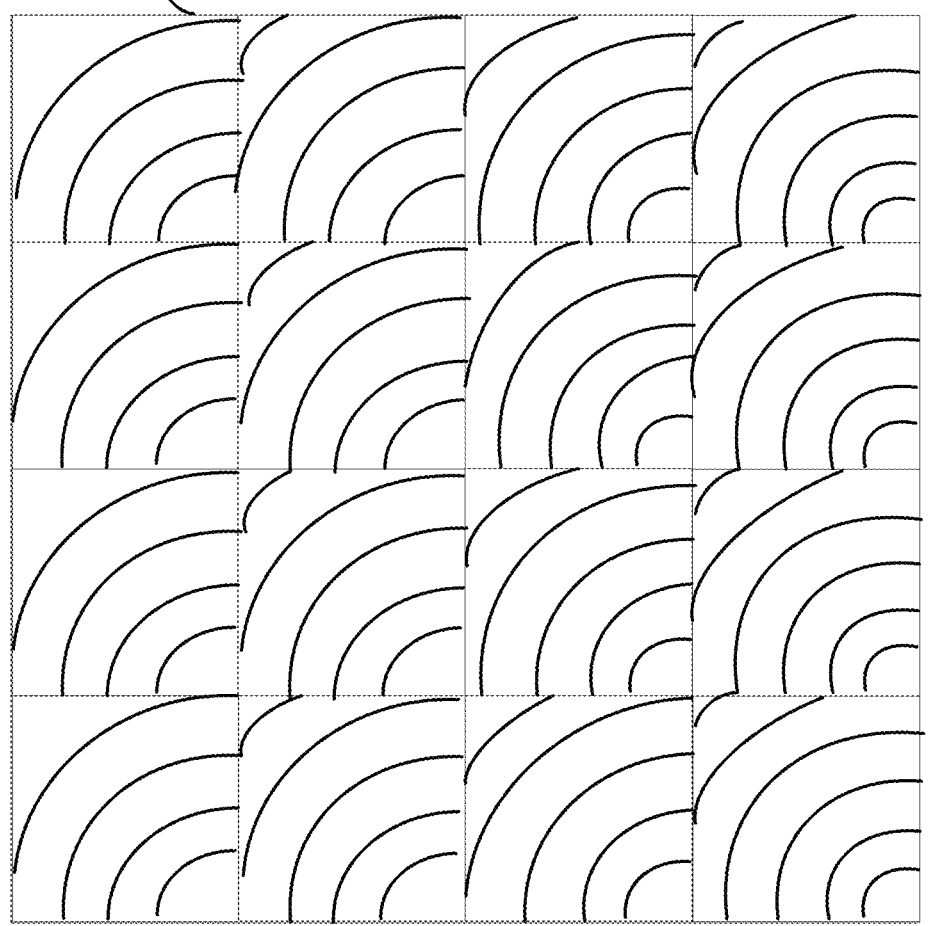
FIG. 16A illustrates an example of a chirped surface-relief grating coupler including multiple sections according to certain embodiments.

FIG. 16A illustrates an example of a chirped surface-relief grating coupler 1600 including multiple sections according to certain embodiments. In the example shown in FIG. 16A, chirped surface-relief grating coupler 1600 may be divided into multiple sections 1610 arranged in a two-dimensional array. For example, in one embodiment, the area of a chirped surface-relief grating coupler may be 0.8 mm×0.8 mm, and each section may have an area 100 μm×100 μm. Thus, the chirped surface-relief grating coupler may include a total of 64 sections in a 8×8 array. In some embodiments, each section 1610 may be smaller and the chirped surface-relief grating coupler may include more sections. In some embodiments, sections 1610 may have the same or different sizes. Each section 1610 may include a chirped surface-relief grating, the parameters of which may be configured such that each section 1610 may extract light out of the waveguide and project the extracted light at different directions towards the user's eye.

FIG. 16B illustrates an example of a structured light pattern 1650 generated in the far field by an example of a chirped surface-relief grating coupler that includes multiple sections, such as chirped surface-relief grating coupler 1600. Structured light pattern 1650 may include a two dimensional array of light spots that can be projected onto the user's eye by a chirped surface-relief grating coupler. Even though the light spots in the example shown in FIG. 16B are uniformly distributed according to a square pattern, in some other embodiments, the structured light pattern generated by a chirped surface-relief grating coupler may be in other shape (e.g., circular, spiral, or rectangular shape) or may be non-uniformly distributed.

In some embodiments, the grating couplers may be used to generate structured light patterns that include multiple light stripes. For example, two or more grating couplers may be used to couple light out of the waveguide, where the coupled light may interfere to generate an interference pattern with alternating bright-dark bars having a sinusoidal intensity pattern (referred to as interference fringes) for illuminating the user's eye. In some embodiments, the interference fringe pattern can be used for fringe interferometry to measure the 3-D shape and position of the user's eye. For example, fringe patterns with different fringe periods and phases can be generated to illuminate the user's eye or face, and the deformation of the fringe patterns by the user's eye or face may be measured to determine the 3-D shape and position of the user's eye or face.

Figure 17:
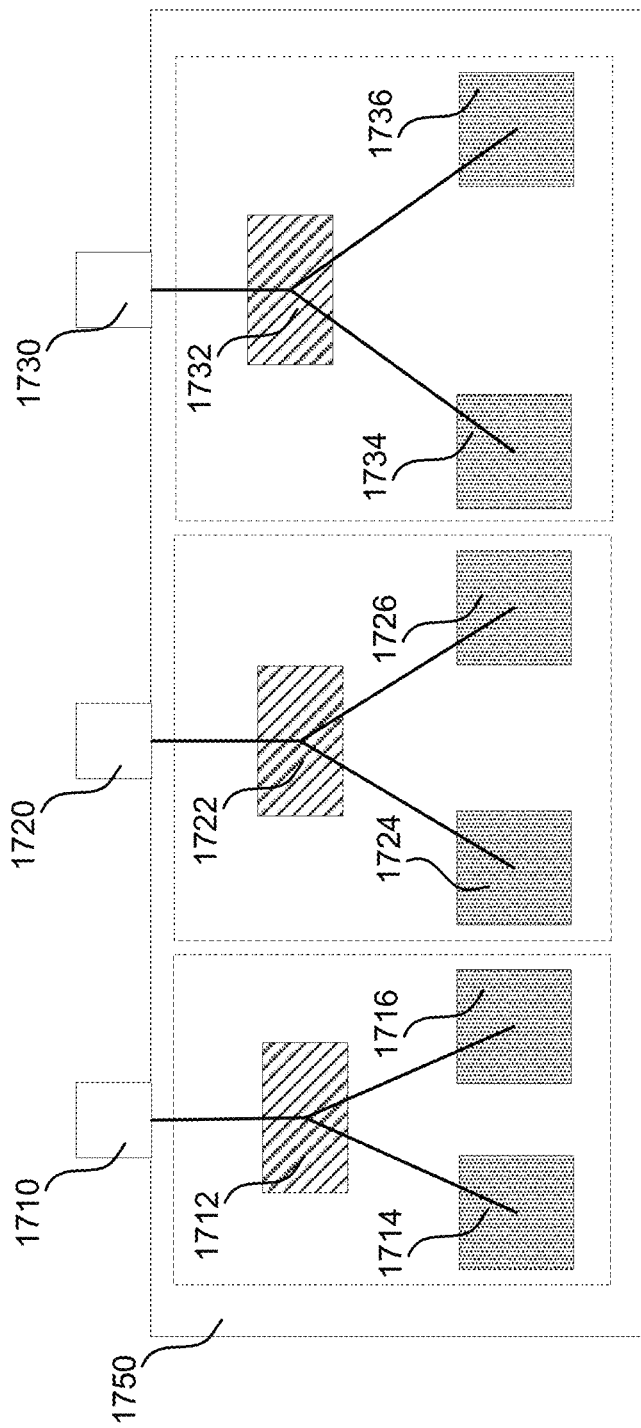
FIG. 17 illustrates examples of grating couplers for generating interference fringe patterns according to certain embodiments.

FIG. 17 illustrates examples of grating couplers for generating interference fringe patterns according to certain embodiments. In the examples shown in FIG. 17, light from a light source 1710 may be coupled into a substrate 1750. The coupled light may be diffracted by a grating 1712 formed on substrate 1750 into two diffraction orders. Each diffraction order may then be coupled out of substrate 1750 by a grating 1714 or 1716 towards user's eye as described above. The light beam coupled out of substrate 1750 by grating 1714 and the light beam coupled out of substrate 1750 by grating 1716 are from a same light source 1710, and thus are coherent and may interfere with each other to form a fringe pattern given by:

$$I(\theta) \propto \cos^2\left[\pi \frac{d}{\lambda}(\theta - \theta_0)\right],$$

where λ is the wavelength of the light, d is the distance between the centers of gratings 1714 and 1716, and $\theta_0$ is the phase difference between the light beams coupled out of substrate 1750 by gratings 1714 and 1716. Distance d may affect the period of the interference fringe pattern. $\theta_0$ may affect the lateral position of the interference fringe pattern, i.e., the specific location of the dark and bright bands (also referred to as the "phase" of the fringe pattern). In some embodiments, $\theta_0$ may be 0. In some embodiments, a desired $\theta_0$ may be achieved by adjusting the diffraction angle of the two diffraction orders of grating 1712 and/or changing the location of grating 1714 or 1716.

In some embodiments, a set of fringe patterns with different periods may be generated by different sets of grating couplers. For example, light from a light source 1720 may be coupled into a substrate 1750. The coupled light may be diffracted by a grating 1722 formed on substrate 1750 into two diffraction orders. Each diffraction order may then be coupled out of substrate 1750 by a grating 1724 or 1726 towards user's eye as described above. The distance between the centers of gratings 1724 and 1726 may be different from (e.g., larger than) the distance between the centers of gratings 1714 and 1716. Thus, the period of the fringe pattern formed by gratings 1724 and 1726 may be different from (e.g., smaller than) the period of the fringe pattern formed by gratings 1714 and 1716. Similarly, light from a light source 1730 may be coupled into a substrate 1750. The coupled light may be diffracted by a grating 1732 formed on substrate 1750 into two diffraction orders. Each diffraction order may then be coupled out of substrate 1750 by a grating 1734 or 1736 towards user's eye as described above. The distance between the centers of gratings 1734 and 1736 may be different from the distance between the centers of gratings 1714 and 1716 or the distance between the centers of gratings 1724 and 1726. Thus, the period of the fringe pattern formed by gratings 1734 and 1736 may be different from the period of the fringe pattern formed by gratings 1714 and 1716 or the period of the fringe pattern formed by gratings 1724 and 1726. The set of fringe patterns with different periods and/or phases may be used for fringe interferometry to determine the 3-D shape and position of the user's eye or face.

Figure 18C:
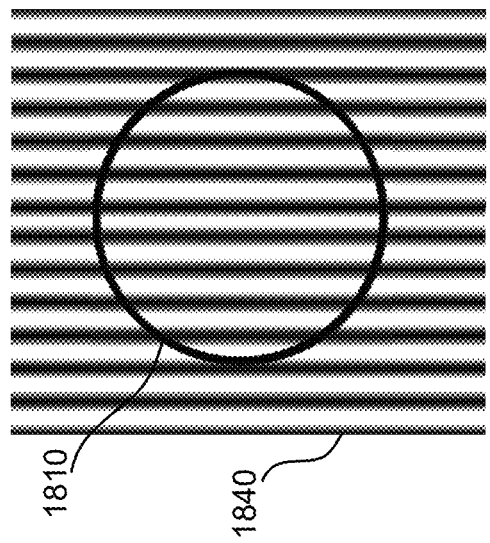
FIGS. 18A-18C illustrate examples of fringe patterns formed using grating couplers according to certain embodiments.
Figure 18B:
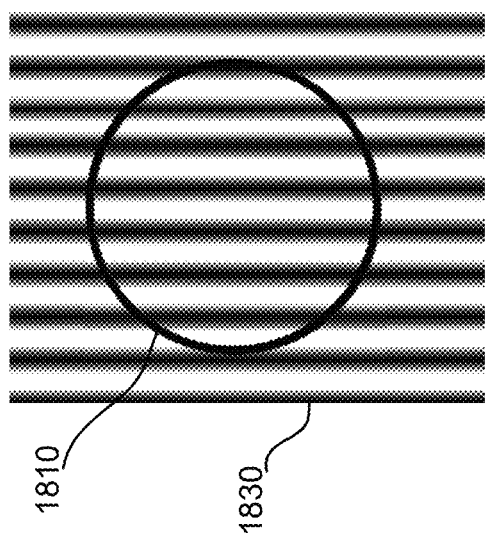
Figure 18A:
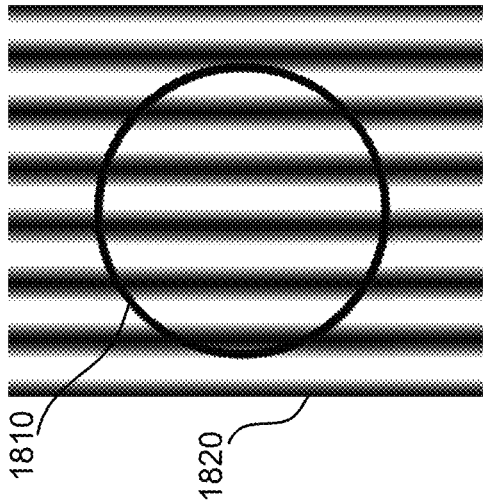

FIGS. 18A-18C illustrate examples of fringe patterns formed using grating couplers according to certain embodiments. FIG. 18A illustrates an example of a fringe pattern 1820 illuminating a user's eye 1810. Fringe pattern 1820 may be formed by, for example, light beams coupled out of substrate 1750 by gratings 1714 and 1716. FIG. 18B illustrates an example of a fringe pattern 1830 illuminating a user's eye 1810. Fringe pattern 1830 may be formed by, for example, light beams coupled out of substrate 1750 by gratings 1724 and 1726. FIG. 18C illustrates an example of a fringe pattern 1840 illuminating a user's eye 1810. Fringe pattern 1840 may be formed by, for example, light beams coupled out of substrate 1750 by gratings 1734 and 1736. Images of the user's eye illuminated by fringe patterns 1820, 1830, and 1840 may be captured and used to determine the 3-D shape and/or position of the user's eye or face as described above.

Figure 19:
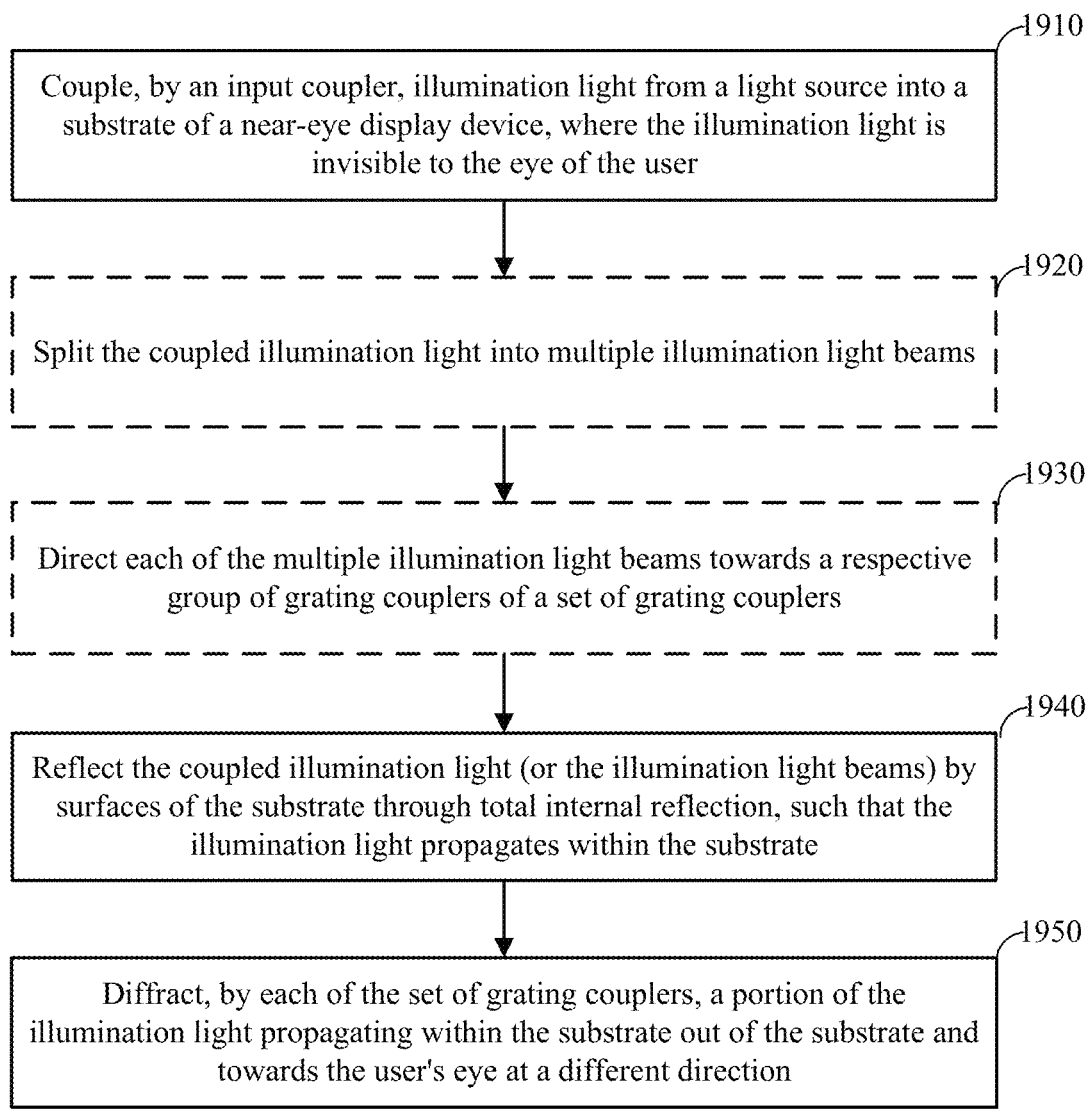
FIG. 19 is a simplified flow chart illustrating an example of a method of illuminating an user's eye for eye-tracking according to certain embodiments.

FIG. 19 is a simplified flow chart 1900 illustrating an example of a method of illuminating an user's eye for eye-tracking according to certain embodiments. The operations described in flow chart 1900 are for illustration purposes only and are not intended to be limiting. In various implementations, modifications may be made to flow chart 1900 to add additional operations, omit some operations, combine some operations, split some operations, or reorder some operations. The operations described in flow chart 1900 may be performed using, for example, eye-tracking unit 130, near-eye display system 900 or 1000, display panel 1100 or 1150, or near-eye display system 1500 described above.

At block 1910, an input coupler may couple illumination light from a light source into a substrate of an eye-tracking unit of a near-eye display system. The illumination light may be invisible to the user's eye, such as infrared light. The light source may include an LED, LD, VCSEL, or other monochromatic or coherent light source. The light source may be positioned at a peripheral of the field of view of the user's eye, such as on a frame the near-eye display system. The input coupler may include a diffractive grating, a prism, a wedge, a slanted transmissive surface, or a slanted reflective surface. The input coupler may be configured such that the illumination light coupled into the substrate is at an angle greater than a threshold value (e.g., critical angle for the substrate) with respect to the surface normal of the substrate. In some embodiments, the near-eye display system may include two or more light sources and two or more input couplers each corresponding to a respective light source and configured to couple illumination light from the respective light source into the substrate.

Optionally, at block 1920, a beam splitter may split the coupled illumination light into multiple illumination light beams. The beam splitter may include one or more diffractive gratings. In some embodiments, the illumination light coupled in the substrate may propagate within the substrate in one direction (e.g., y direction), and a portion of the illumination light may be diverted by each of an array of gratings (e.g., gratings 1170) to propagate in another direction (e.g., x direction) as described above with respect to FIG. 11B. In this way, the illumination light coupled into the substrate may be split into multiple beams propagating in parallel in the x direction. In some embodiments, the input coupler may include a grating that can act as both an input coupler and a beam splitter.

Optionally, at block 1930, each grating in the array of gratings (e.g., gratings 1170) may direct a respective one of the multiple illumination light beams towards a respective group of grating couplers in the set of grating couplers as shown in FIG. 11B.

At block 1940, the substrate may reflect the coupled illumination light at the surfaces of the substrate through total internal reflection, such that the illumination light propagates within the substrate as shown in, for example, FIGS. 10 and 15.

At block 1950, each of the set of grating couplers may diffract a portion of the illumination light propagating within the substrate out of the substrate and towards the user's eye at a different direction. Each grating coupler may have a varying grating period and/or tilt angle within the region of the grating coupler. In some embodiments, the grating period and/or tilt angle may vary in two orthogonal directions (e.g., x and y directions). In some embodiments, each grating coupler may include multiple regions, where the grating parameters for each region may be configured such that each region may couple a portion of the illumination light propagating within the substrate out of the substrate and towards a different region on the user's eye. In some embodiments, illumination light coupled out of the substrate by two grating couplers may interfere to form a fringe pattern on the user's eye. The illumination light may be reflected by different portions of the user's eye and the reflected light may be collected by a camera to generate images of the user's eye. The images of the user's eye may then be analyzed to determine the shape and position of the user's eye.

As described above, the grating couplers may include chirped surface-relief gratings or volume holographic gratings. Chirped surface-relief gratings may be made using, for example, dry or wet etching or nanoimprint techniques. Volume holographic gratings, such as holographic volume Bragg gratings, may be made by holographic recording as described in detail below.

Figure 20:
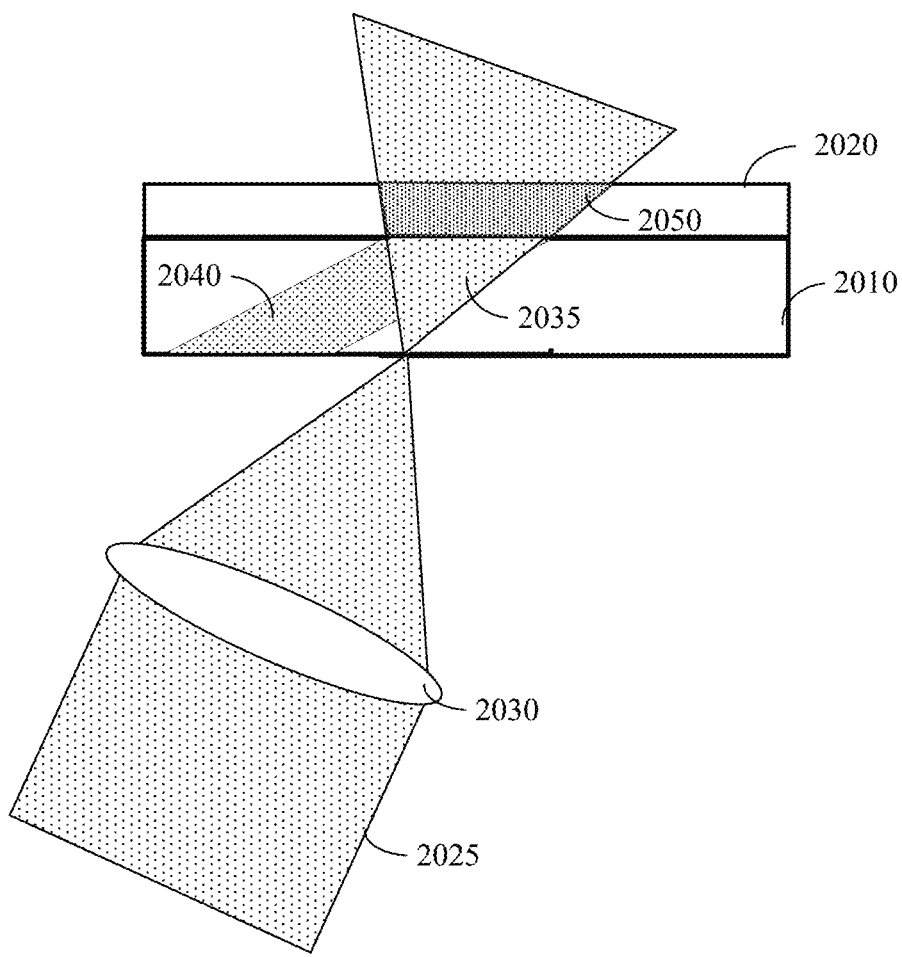
FIG. 20 illustrates an example of a setup for recording holographic gratings according to certain embodiments.

FIG. 20 illustrates an example of a setup 2000 for recording holographic gratings according to certain embodiments. To record a holographic grating, an object beam and a reference beam may be combined to generate a pattern on a photosensitive material layer. For example, as shown in FIG. 20, a photosensitive material layer 2020 may be formed on a substrate 2010 as described above. Photosensitive material layer 2020 may include photopolymers, silver halide, resin, epoxy, etc. In one example, photosensitive material layer 2020 may include polymeric binders, acrylic monomers, and plasticizers, as well as initiating agents, such as initiators, chain transfer agents, or photosensitizing dyes. The binders may act as the support matrix. The monomers may serve as refractive index modulators. The choice of monomers and binders may affect the physical properties of photosensitive material layer 2020 and the magnitude of the refractive index modulation. The photosensitizing dyes may absorb light and interact with the initiators to polymerize the monomers. In various embodiments, photosensitive material layer 2020 may be laminated, spin-coated, or cast on substrate 2010, or encapsulated by substrate 2010.

An object beam 2035 may be formed by a lens system 2030 using an incoming beam 2025. Object beam 2035 may be configured such that the optical field (or wavefront) of object beam 2035 may be similar to the desired output beam from the recorded volume holographic grating. A reference beam 2040, which may be coherent with object beam 2035, may illuminate a same area of photosensitive material layer 2020 as object beam 2035, and thus an interference pattern may be formed at the area of photosensitive material layer 2020. The inference pattern may cause the polymerization and diffusion of the monomer molecules to bright fringes, thus generating concentration and density gradients that may result in refractive index modulation. Areas with a higher concentration of polymerization may have a higher refractive index. As the exposure and polymerization proceed, photosensitive material layer 2020 may harden, the diffusion may be suppressed, and the holographic recording may eventually stop. In some embodiments, the recorded holographic grating on the photosensitive layer may be UV cured or thermally cured or enhanced, for example, for dye bleaching, completing polymerization, permanently fixing the recorded pattern, and enhancing the refractive index modulation. At the end of the process, a hologram or holographic grating 2050 may be formed. Holographic grating 2050 can be a volume Bragg grating with a thickness of, such as, for example, a few, or tens, or hundreds of microns.

Figure 21:
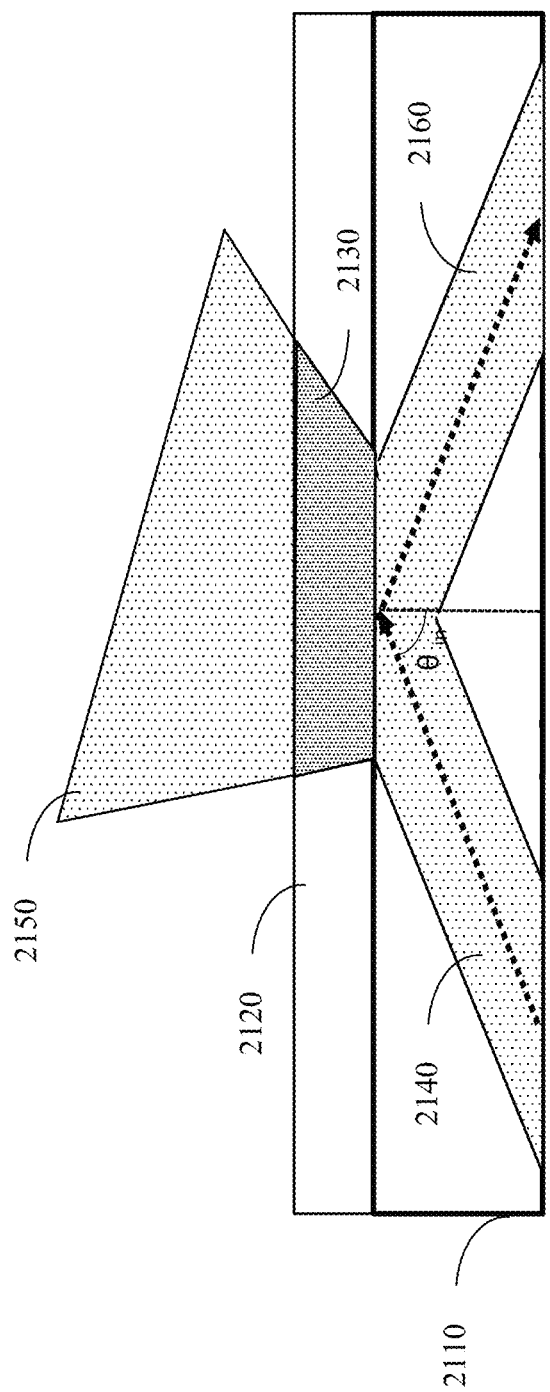
FIG. 21 illustrates an example of light field reconstruction using a holographic grating according to certain embodiments.

FIG. 21 illustrates an example of light field reconstruction using a holographic grating 2130 according to certain embodiments. To reconstruct the light field of the object light used to record holographic grating 2130 in a grating layer 2120 formed on a substrate 2110, a reference light beam 2140 may illuminate holographic grating 2130 from an angle similar to the incident angle of the reference beam used to record the holographic grating. Depending on the diffraction efficiency of holographic grating 2130, a portion of reference beam 2140 may be diffracted by holographic grating 2130 as diffracted beam 2150, which may have the same optical field or wavefront as the object light used to record holographic grating 2130. A portion of reference beam 2140 may be reflected at the interface between substrate 2110 and photosensitive layer 2120 as reflected beam 2160, which may propagate within substrate 2110 due to total internal reflection.

Figure 22:
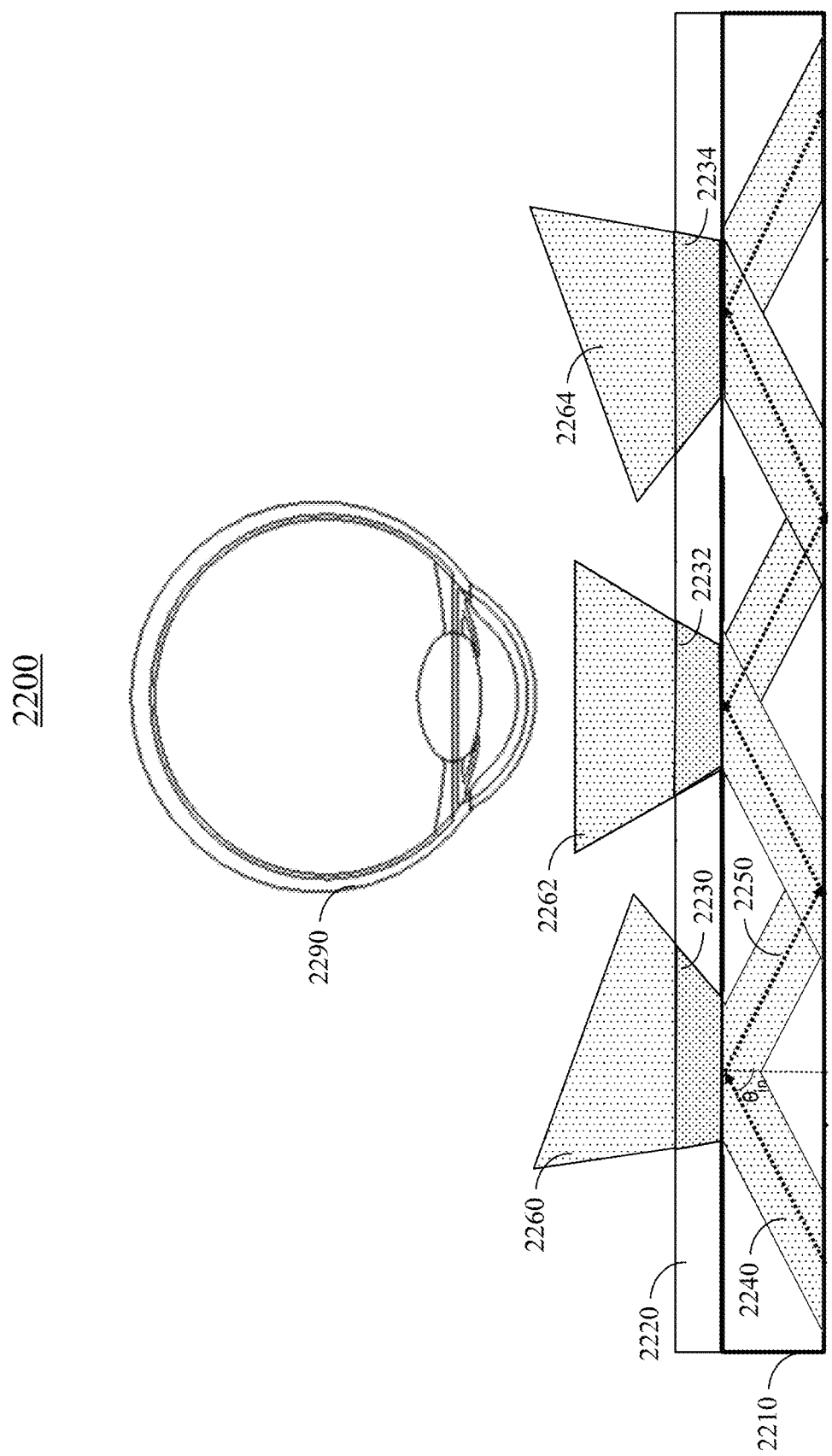
FIG. 22 illustrates an example of an eye illumination device including holographic grating couplers.

FIG. 22 illustrates an example of an eye illumination device 2200 including multiple holographic grating couplers. In the example, eye illumination device 2200 may include a substrate 2210 as described above, and a grating layer 2220 formed on substrate 2210. Grating layer 2220 may include multiple holographic grating couplers that are recorded at different conditions and thus are configured to generate different reconstruction beams. A reference light beam 2240 (e.g., an illumination light beam from an illumination light source, such as a laser diode) may be coupled into substrate 2210 at a certain angle (e.g., similar to the angle of the reference beam used to record the holographic grating couplers) so as to propagate within substrate 2210 through total internal reflection. When reference light beam 2240 is incident on a holographic grating coupler 2230, a portion of reference light beam 2240 may be diffracted as beam 2260 towards user's eye 2290. Beam 2260 may have a similar wavefront as the object light beam used to record holographic grating coupler 2230. A portion of reference light beam 2240 may be reflected as light beam 2250 and may continue to propagate within substrate 2210. When the reference light beam is incident on a holographic grating coupler 2232, a portion of the reference light beam may be diffracted as beam 2262 towards user's eye 2290. Beam 2262 may have a similar wavefront as the object light beam used to record holographic grating coupler 2232. Similarly, when the reference light beam is incident on a holographic grating coupler 2234, a portion of the reference light beam may be diffracted as beam 2264 towards user's eye 2290. Beam 2264 may have a similar wavefront as the object light beam used to record holographic grating coupler 2234. In this way, multiple illumination light beams may be directed to user's eye 2290 at different angles from different locations of eye illumination device 2200.

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 23:
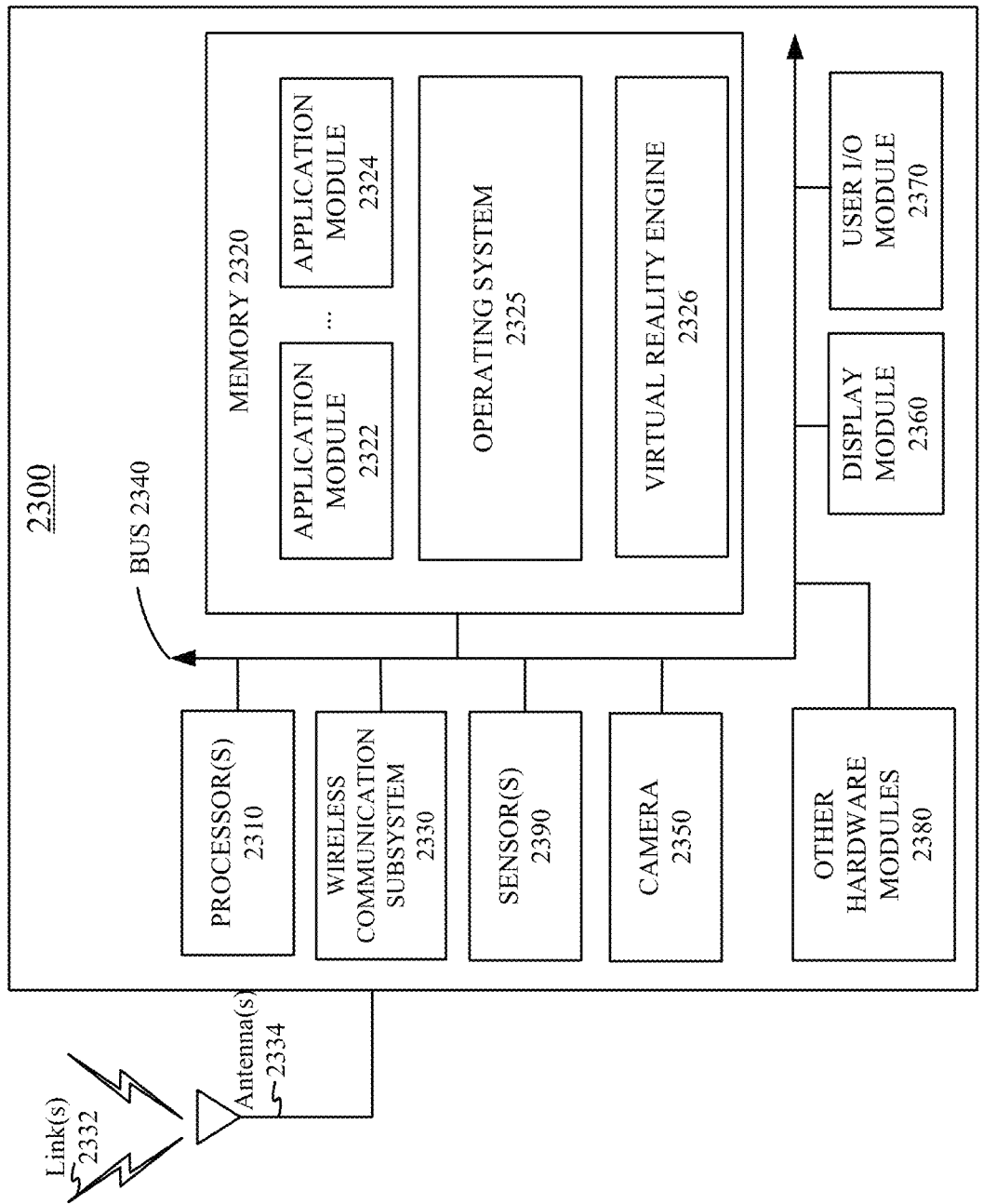
FIG. 23 is a simplified block diagram of an example of an electronic system of a near-eye display system according to certain embodiments.

FIG. 23 is a simplified block diagram of an example of an electronic system 2300 of a near-eye display system (e.g., HMD device) for implementing some of the examples disclosed herein. Electronic system 2300 may be used as the electronic system of an HMD device or other near-eye displays described above. In this example, electronic system 2300 may include one or more processor(s) 2310 and a memory 2320. Processor(s) 2310 may be configured to execute instructions for performing operations at a number of components, and can be, for example, a general-purpose processor or microprocessor suitable for implementation within a portable electronic device. Processor(s) 2310 may be communicatively coupled with a plurality of components within electronic system 2300. To realize this communicative coupling, processor(s) 2310 may communicate with the other illustrated components across a bus 2340. Bus 2340 may be any subsystem adapted to transfer data within electronic system 2300. Bus 2340 may include a plurality of computer buses and additional circuitry to transfer data.

Memory 2320 may be coupled to processor(s) 2310. In some embodiments, memory 2320 may offer both short-term and long-term storage and may be divided into several units. Memory 2320 may be volatile, such as static random access memory (SRAM) and/or dynamic random access memory (DRAM) and/or non-volatile, such as read-only memory (ROM), flash memory, and the like. Furthermore, memory 2320 may include removable storage devices, such as secure digital (SD) cards. Memory 2320 may provide storage of computer-readable instructions, data structures, program modules, and other data for electronic system 2300. In some embodiments, memory 2320 may be distributed into different hardware modules. A set of instructions and/or code might be stored on memory 2320. The instructions might take the form of executable code that may be executable by electronic system 2300, and/or might take the form of source and/or installable code, which, upon compilation and/or installation on electronic system 2300 (e.g., using any of a variety of generally available compilers, installation programs, compression/decompression utilities, etc.), may take the form of executable code.

In some embodiments, memory 2320 may store a plurality of application modules 2322 through 2324, which may include any number of applications. Examples of applications may include gaming applications, conferencing applications, video playback applications, or other suitable applications. The applications may include a depth sensing function or eye tracking function. Application modules 2322-2324 may include particular instructions to be executed by processor(s) 2310. In some embodiments, certain applications or parts of application modules 2322-2324 may be executable by other hardware modules 2380. In certain embodiments, memory 2320 may additionally include secure memory, which may include additional security controls to prevent copying or other unauthorized access to secure information.

In some embodiments, memory 2320 may include an operating system 2325 loaded therein. Operating system 2325 may be operable to initiate the execution of the instructions provided by application modules 2322-2324 and/or manage other hardware modules 2380 as well as interfaces with a wireless communication subsystem 2330 which may include one or more wireless transceivers. Operating system 2325 may be adapted to perform other operations across the components of electronic system 2300 including threading, resource management, data storage control and other similar functionality.

Wireless communication subsystem 2330 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2300 may include one or more antennas 2334 for wireless communication as part of wireless communication subsystem 2330 or as a separate component coupled to any portion of the system. Depending on desired functionality, wireless communication subsystem 2330 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2330 may permit data to be exchanged with a network, other computer systems, and/or any other devices described herein. Wireless communication subsystem 2330 may include a means for transmitting or receiving data, such as identifiers of HMD devices, position data, a geographic map, a heat map, photos, or videos, using antenna(s) 2334 and wireless link(s) 2332. Wireless communication subsystem 2330, processor(s) 2310, and memory 2320 may together comprise at least a part of one or more of a means for performing some functions disclosed herein.

Embodiments of electronic system 2300 may also include one or more sensors 2390. Sensor(s) 2390 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2390 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2300 may include a display module 2360. Display module 2360 may be a near-eye display, and may graphically present information, such as images, videos, and various instructions, from electronic system 2300 to a user. Such information may be derived from one or more application modules 2322-2324, virtual reality engine 2326, one or more other hardware modules 2380, a combination thereof, or any other suitable means for resolving graphical content for the user (e.g., by operating system 2325). Display module 2360 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 2300 may include a user input/output module 2370. User input/output module 2370 may allow a user to send action requests to electronic system 2300. An action request may be a request to perform a particular action. For example, an action request may be to start or end an application or to perform a particular action within the application. User input/output module 2370 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2300. In some embodiments, user input/output module 2370 may provide haptic feedback to the user in accordance with instructions received from electronic system 2300. For example, the haptic feedback may be provided when an action request is received or has been performed.

Electronic system 2300 may include a camera 2350 that may be used to take photos or videos of a user, for example, for tracking the user's eye position. Camera 2350 may also be used to take photos or videos of the environment, for example, for VR, AR, or MR applications. Camera 2350 may include, for example, a complementary metal-oxide-semiconductor (CMOS) image sensor with a few millions or tens of millions of pixels. In some implementations, camera 2350 may include two or more cameras that may be used to capture 3-D images.

In some embodiments, electronic system 2300 may include a plurality of other hardware modules 2380. Each of other hardware modules 2380 may be a physical module within electronic system 2300. While each of other hardware modules 2380 may be permanently configured as a structure, some of other hardware modules 2380 may be temporarily configured to perform specific functions or temporarily activated. Examples of other hardware modules 2380 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2380 may be implemented in software.

In some embodiments, memory 2320 of electronic system 2300 may also store a virtual reality engine 2326. Virtual reality engine 2326 may execute applications within electronic system 2300 and receive position information, acceleration information, velocity information, predicted future positions, or some combination thereof of the HMD device from the various sensors. In some embodiments, the information received by virtual reality engine 2326 may be used for producing a signal (e.g., display instructions) to display module 2360. For example, if the received information indicates that the user has looked to the left, virtual reality engine 2326 may generate content for the HMD device that mirrors the user's movement in a virtual environment. Additionally, virtual reality engine 2326 may perform an action within an application in response to an action request received from user input/output module 2370 and provide feedback to the user. The provided feedback may be visual, audible, or haptic feedback. In some implementations, processor(s) 2310 may include one or more GPUs that may execute virtual reality engine 2326.

In various implementations, the above-described hardware and modules may be implemented on a single device or on multiple devices that can communicate with one another using wired or wireless connections. For example, in some implementations, some components or modules, such as GPUs, virtual reality engine 2326, and applications (e.g., tracking application), may be implemented on a console separate from the head-mounted display device. In some implementations, one console may be connected to or support more than one HMD.

In alternative configurations, different and/or additional components may be included in electronic system 2300. Similarly, functionality of one or more of the components can be distributed among the components in a manner different from the manner described above. For example, in some embodiments, electronic system 2300 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A near-eye display system comprising:
    a substrate transparent to visible light and configured to be placed in front of a user's eye;
    one or more light sources that emit illumination light invisible to the user's eye for eye tracking;
    one or more input couplers that couple the illumination light into the substrate, wherein the illumination light coupled into the substrate propagates within the substrate through total internal reflection; and
    two or more output grating couplers formed on the substrate, the two or more output grating couplers including at least one of a chirped surface-relief grating coupler or a volume Bragg grating coupler, each output grating coupler of the two or more output grating couplers characterized by a different respective grating parameter and coupling a portion of the illumination light propagating within the substrate out of the substrate and towards the user's eye at a different respective angular direction to form a different respective virtual light source in a field of view of the user's eye for eye illumination,
    wherein a distance between the respective virtual light source and the user's eye is greater than a distance between the output grating coupler and the user's eye.

2. The near-eye display system of claim 1, wherein the one or more light sources are positioned in a peripheral of the field of view of the user's eye.

3. The near-eye display system of claim 1, wherein:
    the one or more light sources include two or more light sources;
    the one or more input couplers include two or more input couplers, each input coupler corresponding to a respective light source and configured to couple the illumination light from the respective light source into the substrate; and
    the two or more output grating couplers include two or more groups of grating couplers, each group of grating couplers aligned with a respective input coupler and configured to direct the illumination light from a corresponding light source towards the user's eye.

4. The near-eye display system of claim 1, wherein:
    the one or more light sources include one light source;
    the one or more input couplers include one input coupler;
    the two or more output grating couplers include two or more groups of grating couplers; and
    the near-eye display system further includes two or more diffractive gratings formed on the substrate, each diffractive grating aligned with a respective group of grating couplers and configured to divert a portion of the illumination light from the light source towards the respective group of grating couplers.

5. The near-eye display system of claim 1, wherein the one or more input couplers include a diffractive grating, a prism, a slanted transmissive surface, or a slanted reflective surface.

6. The near-eye display system of claim 1, wherein each output grating coupler of the two or more output grating couplers has a varying grating period or tilt angle in a region of the output grating coupler.

7. The near-eye display system of claim 1, wherein each of the two or more output grating couplers include multiple regions, each region including a grating configured to couple a portion of the illumination light propagating within the substrate out of the substrate and towards a different region on the user's eye.

8. The near-eye display system of claim 1, wherein the two or more output grating couplers include two grating couplers, the two grating couplers configured to couple illumination light from a same light source out of the substrate such that the illumination light coupled out of the substrate by the two grating couplers forms an interference fringe pattern on the user's eye.

9. The near-eye display system of claim 1, wherein the one or more light sources include:

a light emitting device including a light emitting diode (LED), a laser diode, or vertical cavity surface emitting lasers (VCSELs); and collimating optics for collimating light emitted by the light emitting device.

10. A display device comprising:

a substrate transparent to visible light and configured to be placed in front of a user's eye;

one or more input couplers that couple illumination light for eye tracking from one or more light sources into the substrate, wherein the illumination light coupled into the substrate propagates within the substrate through total internal reflection, and wherein the illumination light is invisible to the user's eye; and two or more output grating couplers formed on the substrate and transparent to visible light, the two or more output grating couplers including at least one of a chirped surface-relief grating coupler or a volume Bragg grating coupler, each output grating coupler of the two or more output grating couplers characterized by a different respective grating parameter and coupling a portion of the illumination light propagating within the substrate out of the substrate and towards the user's eye at a different respective angular direction to form a different respective virtual light source in a field of view of the user's eye for eye illumination, wherein a distance between the respective virtual light source and the user's eye is greater than a distance between the output grating coupler and the user's eye.

11. The display device of claim 10, wherein:

the one or more input couplers include two or more input couplers, each input coupler corresponding to a respective light source and configured to couple the illumination light from the respective light source into the substrate; and the two or more output grating couplers include two or more groups of grating couplers, each group of grating couplers aligned with a respective input coupler and configured to direct the illumination light from a corresponding light source towards the user's eye.

12. The display device of claim 10, wherein:

the one or more input couplers include one input coupler configured to couple the illumination light from one light source into the substrate;

the two or more output grating couplers include two or more groups of grating couplers; and the display device further includes two or more diffractive gratings formed on the substrate, each diffractive grating aligned with a respective group of grating couplers and configured to divert a portion of the illumination light from the light source towards the respective group of grating couplers.

13. The display device of claim 10, wherein each output grating coupler of the two or more output grating couplers has a varying grating period or tilt angle in a region of the chirped surface-relief grating coupler.

14. The display device of claim 10, wherein each output grating coupler of the two or more output grating couplers includes multiple regions, each region including a grating configured to couple a portion of the illumination light propagating within the substrate out of the substrate and towards a different region on the user's eye.

15. The display device of claim 10, wherein the two or more output grating couplers include two grating couplers, the two grating couplers configured to couple illumination light from a same light source out of the substrate such that the illumination light coupled out of the substrate by the two grating couplers forms an interference fringe pattern on the user's eye.

16. A method of illuminating an eye of a user of a near-eye display system, the method comprising:

coupling, by an input coupler, illumination light for eye tracking from a light source into a substrate of the near-eye display system, wherein the illumination light is invisible to the eye of the user;

reflecting the coupled illumination light by surfaces of the substrate through total internal reflection, such that the illumination light propagates within the substrate; and diffracting, by each output grating coupler of a set of output grating couplers formed at a plurality of locations on the substrate and characterized by respective grating parameters, a portion of the illumination light propagating within the substrate out of the substrate and towards the eye of the user at a different respective angular direction to form a different respective virtual light source in a field of view of the eye of the user for eye illumination, wherein the set of output grating couplers includes at least one of a chirped surface-relief grating coupler or a volume Bragg grating coupler, wherein a distance between the respective virtual light source and the eye of the user is greater than a distance between the output grating coupler and the eye of the user.

17. The method of claim 16, further comprising:

splitting the coupled illumination light into multiple illumination light beams; and directing each of the multiple illumination light beams towards a respective group of grating couplers in the set of output grating couplers.

18. The near-eye display system of claim 1, wherein the two or more output grating couplers form a two-dimensional array of grating couplers on the substrate.

19. The near-eye display system of claim 1, wherein:

the one or more light sources include one light source; and each of the portion of the illumination light coupled out of the substrate and towards the user's eye at the different respective angular direction forms a respective image of the light source on the user's eye.

20. The near-eye display system of claim 1, wherein:

the two or more output grating couplers are formed on a surface of the substrate; and the illumination light propagating within the substrate is reflected at the surface of the substrate.

* * * * *